(12) United States Patent
Miyake et al.

(10) Patent No.: US 7,117,315 B2
(45) Date of Patent: Oct. 3, 2006

(54) METHOD AND APPARATUS FOR CREATING A LOAD MODULE AND A COMPUTER PRODUCT THEREOF

(75) Inventors: Hideo Miyake, Kawasaki (JP); Teruhiko Kamigata, Kawasaki (JP); Akiko Azegami, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 10/603,093

(22) Filed: Jun. 25, 2003

(65) Prior Publication Data

US 2004/0055000 A1 Mar. 18, 2004

(30) Foreign Application Priority Data

Jun. 27, 2002 (JP) .............................. 2002-187230
Aug. 19, 2002 (JP) .............................. 2002-238399

(51) Int. Cl.
*G06F 13/18* (2006.01)

(52) U.S. Cl. ..................... 711/150; 711/139; 711/156; 711/152; 711/151; 718/106; 718/101; 710/240; 710/40

(58) Field of Classification Search ..................... None
See application file for complete search history.

(56) References Cited

U.S. PATENT DOCUMENTS

| | | | | |
|---|---|---|---|---|
| 5,742,790 A | * | 4/1998 | Kawasaki | ..................... 711/128 |
| 6,594,728 B1 | * | 7/2003 | Yeager | ..................... 711/127 |
| 6,600,677 B1 | * | 7/2003 | Afghahi et al. | ............. 365/187 |
| 6,704,822 B1 | * | 3/2004 | Tremblay et al. | ........... 710/244 |

* cited by examiner

*Primary Examiner*—B. James Peikari
(74) *Attorney, Agent, or Firm*—Staas & Halsey LLP

(57) ABSTRACT

Data shared by plural processes of a program are identified and identification information is affixed to the shared data. When the program is linked by a linker, only the shared data to which identification information is affixed are extracted and a shared data area is created for the shared data. During program execution, this shared data area is prevented from being and the main memory is referred to or updated or the cache is invalidated prior to access of the shared data area by the linker. An address of data in a processor is computed from an address of the data in another processor based on a specific expression.

15 Claims, 24 Drawing Sheets

FIG.4

```c
#include <stdio.h>
#include <string.h>
#include "mpi.h"

int
main(int argc, char **argv)
{
    int my_rank;/* RANK OF CURRENT PROCESS */
    int source;/* RANK OF TRANSMISSION PROCESS */
    int dest;/* RANK OF RECEIVING PROCESS */
    int tag=0;/* MESSAGE TAG */
    char message[100];/* STORAGE PLACE OF MESSAGE */
    MPI_Status status;/* RETURN STATUS OF RECEPTION */

/* MPI START UP */
    MPI_Init (&argc, argv) ;

/* REQUEST RANK OF CURRENT PROCESS */
    MPI_Comm_rank (MPI_COMM_WORLD. &my_rank) ;

if (my_rank ! =0) {
      /* MESSAGE CREATION */
      sprintf (message, "Greentings from process %d\n", my_rank) ;
      dest=0 ;
      /*' \USE strlen+1 as 0' is also sent */
      MPI_Send (message. strlen (message)+1, MPI_CHAR, dest, tag,
      MPI_COMM_WORLD) ;
    } else {
      source=1;
      MPI_Recv (message, sizeof(message), MPI_CHAR, source,tag,
      MPI_COMM_WORLD, &status) ;
      printf ("%s \n" , message) ;
    }

/* MPI SHUT DOWN */
      MPI_Finalize () ;
      return 0 ;
}
```

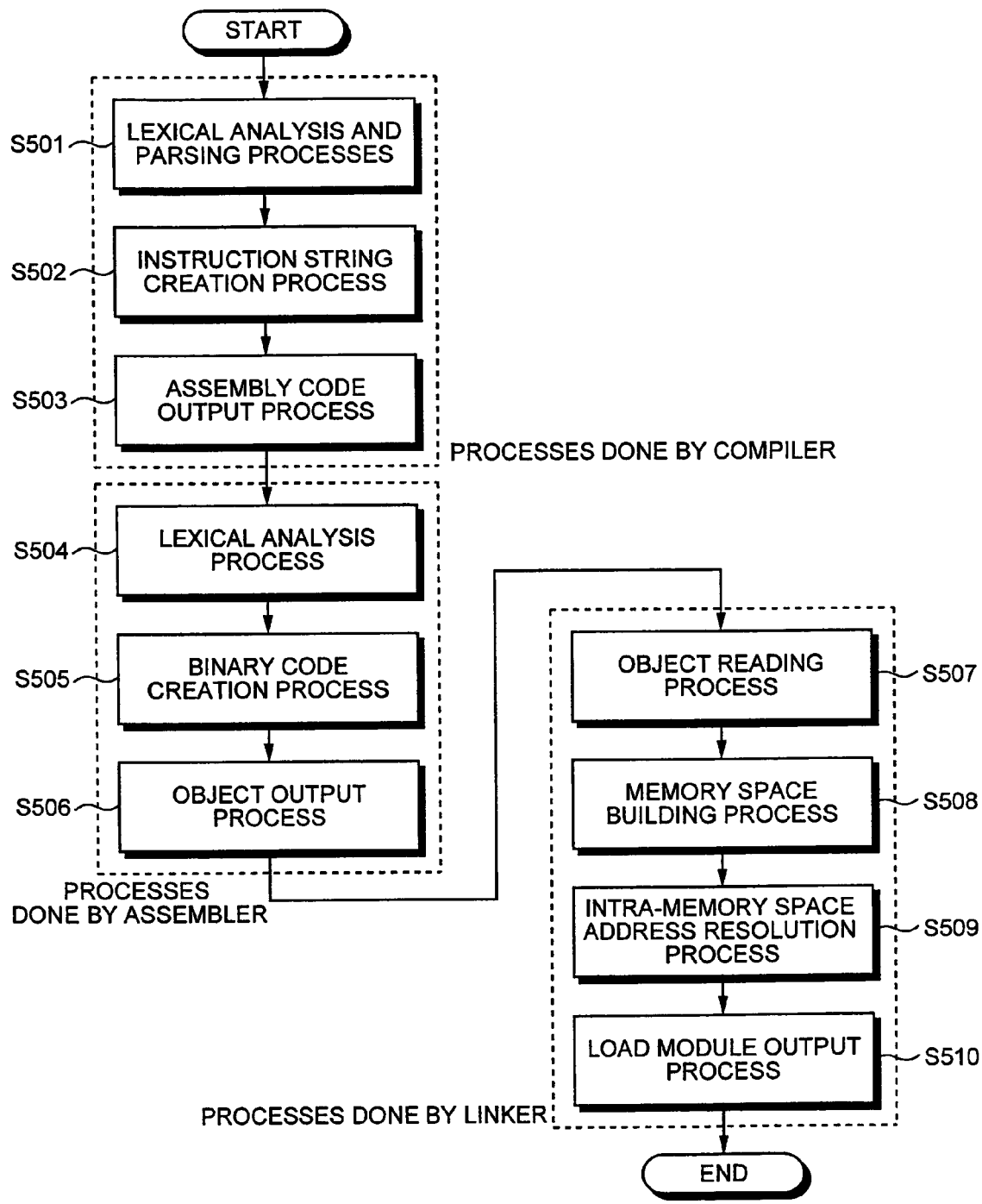

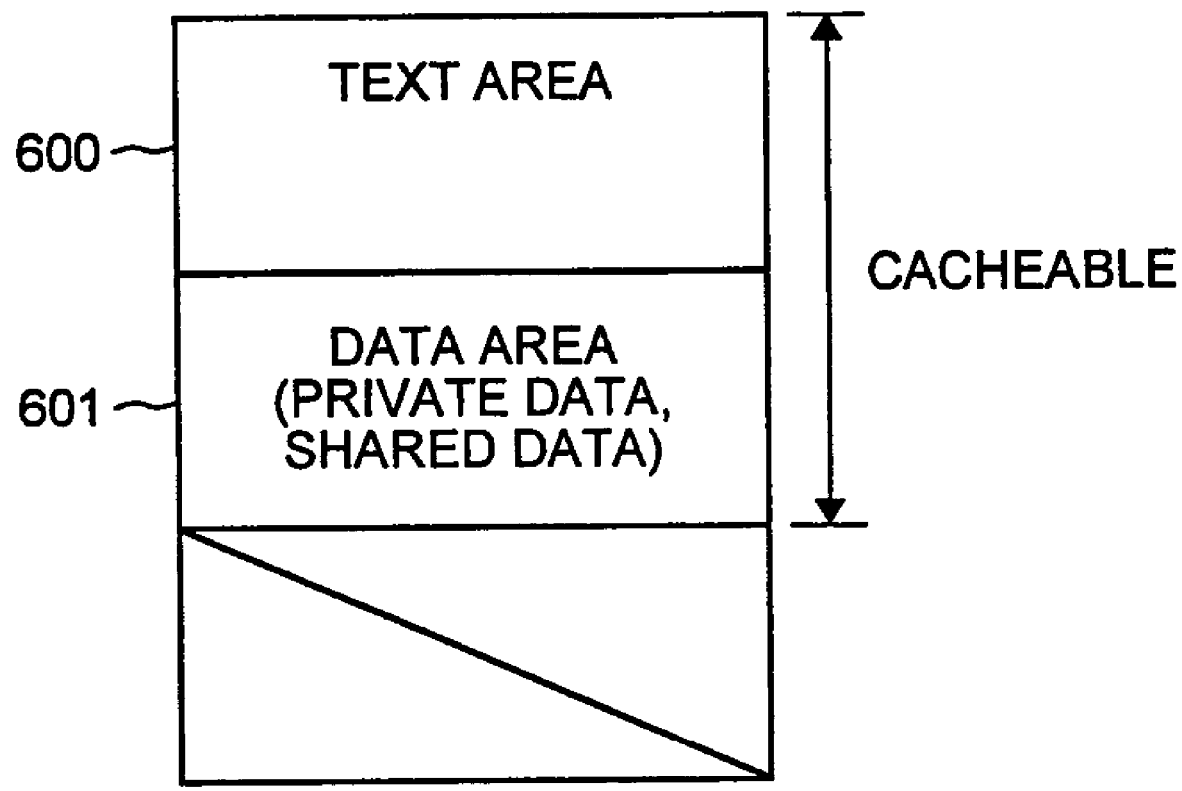

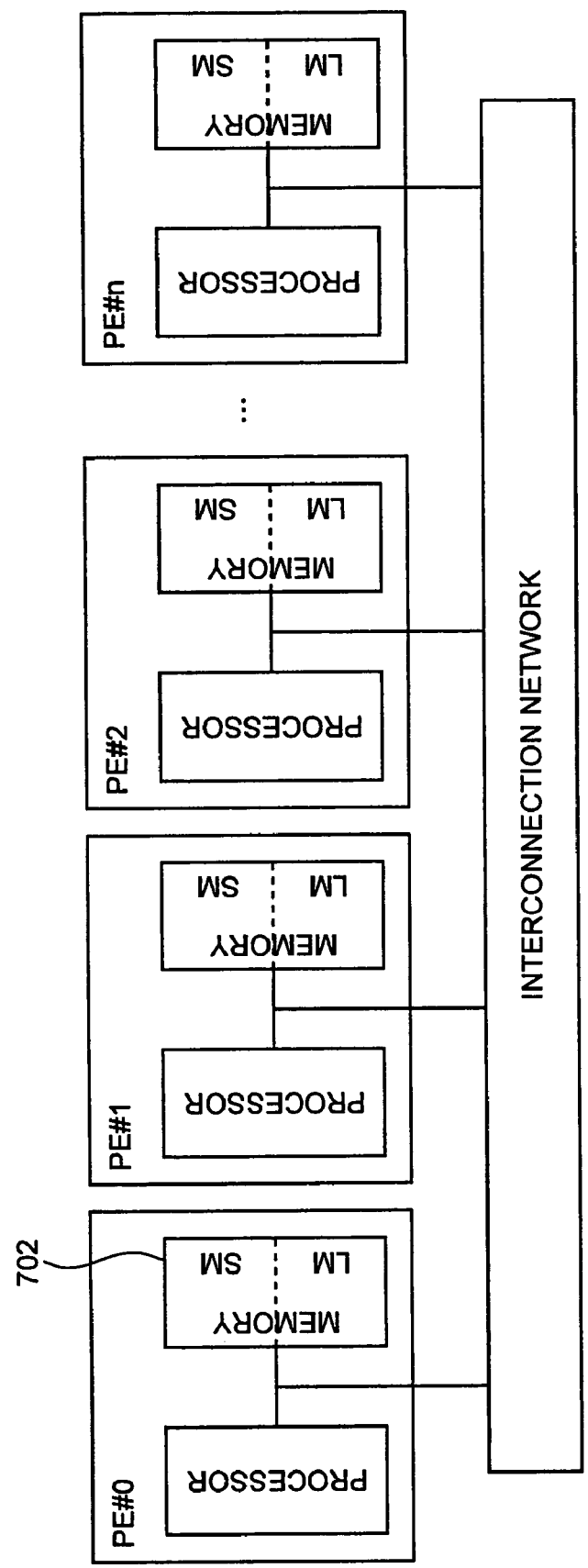

FIG.9

```c
#include <stdio.h>
#include <string.h>
#include "mpi.h"

int
main(int argc, char **argv)
{
    int my_rank;/*RANK OF CURRENT PROCESS*/
    int source;/*RANK OF TRANSMISSION PROCESS*/
    int tag=0;/*MESSAGE TAG*/
    char message[100];/*STORAGE PLACE OF MESSAGE*/
    MPI_Status status;/*RETURN STATUS OF RECEPTION*/

/*MPI START UP*/
    MPI_Init (&argc, argv) ;

/*REQUEST RANK OF CURRENT PROCESS*/
    MPI_Comm_rank (MPI_COMM_WORLD. &my_rank) ;

source=1;
    MPI_Recv (message, sizeof(message), MPI_CHAR, source,tag,
    MPI_COMM_WORLD, &status) ;
    printf ("%s\n", message) ;

/*MPI SHUT DOWN*/
    MPI_Finalize () ;
    return 0 ;
}
```

FIG.10

```c
#include <stdio.h>
#include <string.h>
#include "mpi.h"

int
main(int argc, char **argv)
{
    int my_rank;/* RANK OF CURRENT PROCESS */
    int dest;/* RANK OF RECEIVING PROCESS */
    int tag=0;/* MESSAGE TAG */
    char message[100];/* STORAGE PLACE OF MESSAGE */

/* MPI START UP */
    MPI_Init (&argc, argv) ;

/* REQUEST RANK OF CURRENT PROCESS */
    MPI_Comm_rank (MPI_COMM_WORLD. &my_rank) ;

/* MESSAGE CREATION */
    sprintf (message, "Greentings from process %d\n", my_rank) ;
    dest=0 ;
    /*'\USE strlen +1 as 0' is also sent */
    MPI_Send (message. strlen (message)+1, MPI_CHAR, dest, tag,
    MPI_COMM_WORLD) ;

/* MPI SHUT DOWN */
    MPI_Finalize () ;
    return 0 ;
}
```

FIG.13

```
int input;
int output;
extern int in;
extern int out;

void
Th0(void)
{
        MOVE(&in, &input, sizeof (in));          /*Th0-1*/
        START(1."Th1");                           /*Th0-2*/
        MOVE(&output, &out, sizeof (output));    /*Th0-3*/
}
```

FIG.14

```
int in;
int out;

void
Th1(void)
{
        extern void f1(int*, int*);

f1(&in, &out);                           /*Th1-1*/
}
```

FIG.15

| | MEMORY SPACE OF PE #0 | | MEMORY SPACE OF PE #1 | |
|---|---|---|---|---|
| | ADDRESS | CONTENTS | ADDRESS | CONTENTS |
| TEXT AREA | 0x0000 | void<br>Th0(void)<br>{<br>MOVE(0x3000, 0x1000, sizeof(in));<br>START(1,"Th1");<br>MOVE(0x1004, 0x3004, sizeof(output));<br>} | 0x0000 | void<br>Th1(void)<br>{<br>f1(0x2000, 0x2004));<br>}<br>void<br>f1(int *in, int, *out)<br>{ .......}<br> |
| DATA AREA | 0x1000 | int input; | 0x1000 | |
| | 0x1004 | int output; | | |
| SHARED DATA AREA #0 | 0x2000 | int in; | 0x2000 | int in; |
| | | | | |
| SHARED DATA AREA #1 | 0x3000 | int in; | 0x2004 | int out; |
| | 0x3004 | int out; | | |

FIG.24

| PE IDENTIFICATION | AREA NAME | STARTING ADDRESS | ENDING ADDRESS |
|---|---|---|---|
| PE #0 | TEXT AREA | 0x0000 | 0x0fff |
| | DATA AREA | 0x1000 | 0x1fff |
| | SHARED DATA AREA #0 | 0x2000 | 0x2fff |
| | SHARED DATA AREA #1 | 0x3000 | 0x3fff |
| PE #1 | TEXT AREA | 0x0000 | 0x0fff |
| | DATA AREA | 0x1000 | 0x1fff |
| | SHARED DATA AREA #1 | 0x2000 | 0x2fff |

METHOD AND APPARATUS FOR CREATING A LOAD MODULE AND A COMPUTER PRODUCT THEREOF

CROSS-REFERENCE TO RELATED APPLICATIONS

This application is based upon and claims the benefit of priority from the prior Japanese Patent Application No.2002-187230, filed on Jun. 27, 2002, the entire contents of which are incorporated herein by reference.

BACKGROUND OF THE INVENTION

1) Field of the Invention

The present invention relates to a technology for creating load modules for a program that is executed by a multiprocessor computer system.

2) Description of the Related Art

Most present day computer systems are provided with a plurality of multiprocessors to which parts of a program are distributed in order to enhance a processing efficiency. The multiprocessors can be broadly categorized into shared-memory multiprocessors and distributed-memory multiprocessors.

FIG. 1 is a schematic diagram of a computer system that employs a shared-memory multiprocessor system. Each of the n number of processor elements (hereinafter, "PE") 100 has a processor 101 and a cache 102.

The cache 102 is much smaller than the main memory but has a cache memory that can perform high speed reading and writing. The cache 102 carries out reading from or writing to cache memory or the main memory in response to a read write request from the processor 101. When carrying out reading and writing, the cache 102 keeps a copy of the contents (value) of the memory area of the main memory that was read from or written to the cache memory in order to use the locality of reference at the time of program execution. Therefore, reading and writing can be carried out speedily by accessing the cache memory and by avoiding having to access the main memory.

FIG. 2 is a schematic diagram of a computer system that employs a distributed-memory multiprocessor system. The n number of processor elements (PE #1 to PE #n) 200, each of which includes a processor 201 and a memory 202, are connected via an interconnection network 203.

FIG. 3 is a schematic diagram of memory space definition in the computer system shown in FIG. 2. Each processor 201 reads from and writes to the memory 202 of its own processor element 200.

In the systems that utilize distributed-memory multiprocessors, programs based on single-program multiple-data (SPMD) programming are mainly executed by using a transmitting mechanism, such as a message-passing interface (MPI).

FIG. 4 shows a sample program. The program is distributed in n number of memories 202 and each part of the program is executed by the respective processor 201. Even though a single program is being executed, the process branches according to the an identification number (ID) of the process element 200 and parallel processing by the n number of processor element 200 takes place.

For instance, in the sample program of FIG. 4, 'my_rank' is the ID. In the processor element other than that in which my_rank=0, the process under 'if' is executed. In the processor element in which my_rank=0, the process under 'else' is executed.

FIG. 5 is a flowchart that explains process steps of a load-module creation for the sample program shown in FIG. 4. First, a source code of the program is converted into an assembly code using a compiler (steps S501 to S503). An object is created from the assembly code using an assembler (steps S504 to S506). Plural objects are linked using a linker to create a load module for the program (steps S507 to S510).

(1) The shared-memory multiprocessor system needs to solve the problem of preservation of cache consistency as described in detail below:

Even though the processing speed of the system is enhanced by providing a cache 102 for each processor in a multiprocessor system, there is a disadvantage to it. When plural cache memories are involved, there is a possibility that the memory area value determined by the same address may not match between the cache memories and the main memory. As a result of this, when any of the processors accesses any memory area of the main memory, always the latest value secured in that memory area is returned, thereby causing what is known as a cache coherence problem.

Conventionally, the coherence problem was countered by providing a physical mechanism called 'cache consistency mechanism'. This mechanism is based on the cache consistency protocol that monitors the location of data (hereinafter "shared data") read and written by different processes of a program, prevents caching of old data prior to updation, and preserves cache consistency.

FIG. 6 is an explanatory drawing that shows a memory map in the case in which cache consistency is preserved using the cache consistency mechanism. A text area 600 holds instruction strings of a program, and a data area 601 holds data (both private and shared data) that is read or written by the program.

Both the areas, that is, the text area 600 and the data area 601, are cache target areas. In other words, data in the text area 600 and the data area 601 can be copied in the cache memory. Consequently, the shared data is copied in the cache memory of each of the plural processors that execute part of the program and the value of all the cache memory is made consistent with that of the main memory by this cache consistency mechanism.

However, this method of using a hardware as a cache consistency mechanism for maintaining consistency between the values of cache memory and the main memory can prove to be a complex proposition and is bound to make the processor circuitry bulky.

This did not pose much of a problem in the past as shared-memory multiprocessors were mainly used in high-end products. However, if shared-memory multiprocessors are to be made popular by providing them in printers, digital cameras, digital televisions, and the like, it is imperative that the processors are not made bulky or heavy for the only purpose of maintaining cache consistency. Also, the product cost should not go up because of the number of processors used.

(2) The distributed-memory multiprocessor system needs to solve the problem of solution for address straddling memory space as described in detail below:

The system employing distributed-memory multiprocessor shown in FIG. 2 is built using plural chips (and plural boards) due to limitations in the semiconductor integrated circuit technology that existed in the past. However, due to advancements in the semiconductor technology in recent years, it has become possible to pack plural processor elements 200 in one chip.

Conventionally, when it was not possible to pack plural processor elements in one chip, data transfer was done by packet transmission system. However, when plural processor elements are packed in one chip, the data exchange between the processor element 200 via the interconnection network 203 can be speedily performed by employing the shared-memory for storing and loading of data. The system in which a shared memory that allows reading from and writing to by plural processors is provided is called a distributed shared-memory multiprocessor system.

FIG. 7 is a schematic diagram of a computer system that employs a distributed shared-memory multiprocessor system. Unlike the distributed-memory multiprocessor system shown in FIG. 2, the distributed shared-memory multiprocessor system has two types of memory 702, namely, a shared memory (SM) that can be accessed by processors of other processor elements as well, and a local memory (LM) that can be accessed by only that processor which is contained in the same processor element.

FIG. 8 is an explanatory drawing that shows an example of memory space definition in the distributed shared-memory microprocessor system shown in FIG. 7. The shared memory of the first processor element (PE #1) is allocated in an overlapping manner in the memory space of the processor element PE #0 and the processor element PE #1.

Let us assume that the shared memory of the processor element PE #1 is allocated at the address 0x3000 in the memory space of the processor element PE #0 and at the address 0x2000 in the memory space of processor element PE #1. With this assumption, when the processor element PE #0 writes data to the address 0x2000, the processor element PE #1 can read the same data from the address 0x3000, thus effecting data transfer between the processor element PE #0 and the processor element PE #1.

The memory of processor elements PE #1 through PE #n is allocated in the memory space of processor element PE #0. Therefore, the processor element PE #0 is capable of referring or altering the data in the shared memory of the other processor elements. However, as the memory of other processor elements are not physically allocated in the memory space of the processor elements PE #1 through PE #n, these processor elements can refer or alter data in only their own local memory and shared memory.

Like the computer system using the distributed-memory multiprocessor system, the computer system employing the distributed shared-memory multiprocessor system can also execute the program, shown in FIG. 4, based on single-program multiple-data programming.

However, whether it is a distributed-memory multiprocessor system or a distributed shared-memory multiprocessor system, the entire program is distributed on each of the processor elements, even though only a part of the program is executed by each of the processors. Since the entire program needs to be stored in each processor element, memory requirement of the processor element increases, which results in increase in cost.

The problem of storing the entire program in all the processor elements can be circumvented, at least in the distributed-memory multiprocessor system, by creating programs based on multiple-program multiple-data programming (MPMD) instead of single-program multiple-data.

Unlike the single-program multiple-data programming in which a program resides in all the processor elements, in multiple-program multiple-data based programming, separate programs to be executed by specific processor elements are created. FIG. 9 is a sample program executed by the processor element PE #0 and FIG. 10 is a sample program executed by the processor elements PE #1 through PE #n. As the program to be executed by a particular processor element is exclusive to that processor element, requirement of memory can be reduced to that extent. The load modules of these programs are created according to the sequence of steps shown in the flowchart in FIG. 5.

On the other hand, in the distributed shared-memory multiprocessor system, data stored in an area is accessed by plural processor elements. The address in the memory space of the area being accessed is different for each processor element. Consequently, when resolving addresses using the linker, the address has to be changed for each processor unit even though the same area is accessed. However, in the conventional linker this function is not available.

As a result, all the programs that can be run in a computer system with the distributed shared-memory multiprocessor system can only be created by single-program multiple-data programming. Consequently, in the distributed shared-memory multiprocessor system, even though there may be portions of the program that will not be executed by a particular processor element, the entire program needs to be distributed in all the processor elements necessitating more memory.

SUMMARY OF THE INVENTION

It is an object of the present invention to at least solve the problems in the conventional technology.

The load-module creating method according to one aspect of the present invention is a method for creating a load module for a program that has plural processes, each process of the program being executed by one processor out of plural processors. This load-module creating method comprises determining if, from amongst the plural processes of the program, at least two processes read the same data included in the program; affixing specific identification information to the data that is determined to be read by at least two processes of the program; and forming a non-cacheable area in a memory space where all the data to which the identification information is affixed are kept.

The load-module creating method according to another aspect of the present invention is a method for creating a load module for a program that has plural processes, each process of the program being executed by one processor out of plural processors. This load-module creating method comprises determining if, from amongst the plural processes of the program, at least two processes read the same data included in the program; and affixing a cache-invalidate operation instruction to the data that is determined to be read by at least two processes of the program.

The load-module creating method according to still another aspect of the present invention is a method for creating load modules for a first program executed by a first processor and a second program executed by a second processor. This load-module creating method comprises building a first set of memory areas by linking a first set of objects of the first program executed by the first processor; computing an address for a first symbol in the first program, based on address of the first set of memory areas at the building of the first set of memory areas; building a second set of memory areas by linking a second set of objects of the second program; computing an address for a second symbol in the second program, based on the address of the second set of memory areas at the building of the second set of memory areas; and computing, based on the address of the second symbol, the address of the first symbol whose address is not computed.

The load-module creating apparatus according to still another aspect of the present invention creates a load module for a program that has plural processes, each process of the program being executed by one processor out of plural processors. This load-module creating apparatus comprises a shared data determining unit that determines if, from amongst the plural processes of the program, at least two processes read the same data included in the program; an identification information affixing unit that affixes specific identification information to the data that is determined to be read by at least two processes of the program by the shared data determining unit; and a shared data area forming unit that forms a non-cacheable area in a memory space where all the data to which the identification information is affixed by the identification information affixing unit are kept.

The load-module creating apparatus according to still another aspect of the present invention creates a load module for a program that has plural processes, each process of the program being executed by one processor out of plural processors. This load-module creating apparatus comprises a shared data determining unit that determines, if from amongst the plural processes of the program, at least two processes read the same data included in the program; and a cache-invalidate operation instruction affixing unit that affixes a cache-invalidate operation instruction to the data that is determined to be read by at least two processes of the program by the shared data determining unit.

The load-module creating apparatus according to still another aspect of the present invention creates load modules for a first program executed by a first processor and a second program executed by a second processor. This load-module creating apparatus comprises a first memory space building unit that builds a first set of memory areas by linking a first set of objects of the first program; a first intra-memory address resolution unit that computes an address for a first symbol in the first program, based on the address of the first set of memory areas formed by the first memory space building unit; a second memory space building unit that builds a second set of memory areas by linking a second set of objects of the second program; a second intra-memory address resolution unit that computes an address for a second symbol in the second program, based on the address of the second set of memory areas formed by the second memory space building unit; and an inter-memory space address resolution unit that computes, based on the address of the second symbol computed by the second intra-memory address resolution unit, the address of the first symbol whose address was not resolved by the first intra-memory address resolution unit.

The computer program according to still another aspect of the present invention realizes the method according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is a sample program executed by a computer system employing the distributed-memory multiprocessor system and created based on single-program multiple-data programming;

FIG. 5 is a flowchart that explains process steps of a load-module creation for the sample program shown in FIG. 4;

FIG. 6 is an explanatory drawing that shows the memory map in the case in which cache consistency is preserved using a cache consistency mechanism;

FIG. 7 is a schematic diagram of a computer system that employs a distributed shared-memory multiprocessor system;

FIG. 9 is a sample program (for processor element PE #0) executed by a computer system employing the distributed-memory multiprocessor system and created based on multiple-program multiple-data programming;

FIG. 10 is a sample program (for processor element PE #1 to #n) executed by a computer system employing the distributed-memory multiprocessor system and created based on multiple-program multiple-data programming;

FIG. 13 shows an example of a program (executed by a processor element PE #0) based on multiple-program multiple-data programming that is executed by a computer system that employs a distributed shared memory multiprocessor system;

FIG. 14 shows an example of a program (executed by a processor element PE #1) based on multiple-program multiple-data programming that is executed by a computer system that employs a distributed shared memory multiprocessor system;

FIG. 15 is an explanatory drawing that shows schematically the status after address resolution is carried out when the programs shown in FIG. 13 and FIG. 14 are executed;

FIG. 24 is an explanatory drawing that shows the contents of memory space definition information held in a memory space definition information storing section 2306;

DETAILED DESCRIPTION

Exemplary embodiments of the method of, an apparatus and a computer program for creating load-modules are explained next with reference to the accompanying drawings.

(1) Fundamental Principle of a Shared-Memory Multiprocessor System

The hardware solution by way of cache consistency mechanism is used for preserving consistency of data between cache memory and main memory as well as between cache memory of different processors in the conventional technology. However, with the present invention, a solution for the cache consistency problem is proposed that is entirely software-based. In other words, cache consistency preservation is carried out not by a processor that executes a program but by a program that is executed by a processor.

The following two methods are theoretically proposed as solutions in line with this principle (cf. Zimmer, Cart 'UNIX (R) Kernel analysis—Management of cache and multiprocessor' Soft Bank).

Method 1: A method of avoiding caching shared data in a program: In other words, by always accessing the main memory for reading/writing values, copying of shared data in plural places can be avoided. This method will hereinafter be called "uncache shared data method".

It is possible to specify areas that are not to be copied in the cache memory in the memory space of a processor that includes a memory management unit (MMU). For instance, by setting a C bit (cacheable bit) of a page table entry of the memory management unit, a desired area of a SPARC can be made non-cacheable.

This function is mainly provided when it becomes necessary to uncache a certain area in the case when no separate I/O space is provided, and a part of memory space is used as I/O space. It is reasonable to set such that data is not cached, even at the cost of compromising the processing speed, since having a cache can lead to inability to read/write the latest value.

By somewhat diverting this function, a non-cacheable area can be provided in the memory space of the processor and the shared data can be limited only to this area. By doing this, it can be ensured that only data related to the part of the program being executed by each processor, that is, private data, remains in the cache memory and that since shared memory does not exist in the cache, always the main memory is accessed for reading/writing values.

Figure 11:
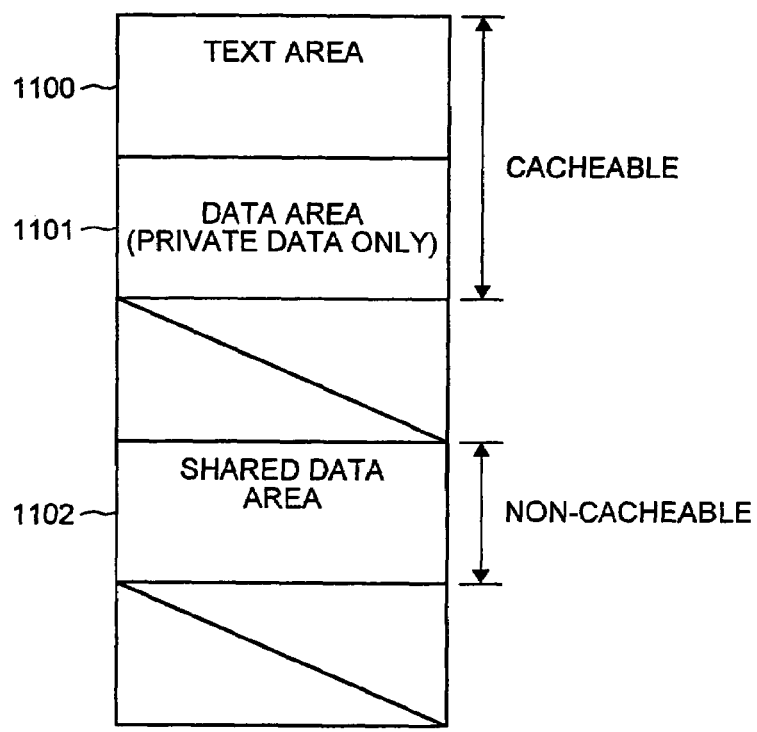
FIG. 11 is an explanatory drawing that shows an example of a memory map in the case in which cache consistency is preserved using a uncache shared data method.

FIG. 11 is an explanatory drawing that shows an example of a memory map in the case in which cache consistency is preserved using the uncache shared data method. A text area 1100 holds instruction strings of a program, and a data area 1101 mainly holds private data from amongst the data that can be read/written from the program. Both the areas, that is, the text area 1100 and the data area 1101, are cache target areas. In other words, data in the text area 1100 and the data area 1101 can be copied in the cache memory.

In contrast, a shared data area 1102 mainly holds shared data from amongst the data that can be read/written from the program. The shared data area 1102 is a non-cacheable area. In other words, data in the shared data area 1102 cannot be copied in the cache memory.

A first embodiment and a second embodiment of the present invention explained below are embodiments in which cache consistency is preserved in a shared-memory multiprocessor system using this uncache shared data method. More specifically, these two embodiments relate to the process of arrangement of the three areas, namely, the text area, the data area and the shared data area, in the memory space when creating a load module of a program, assuming that the uncache shared data method is used for preserving cache consistency.

Method 2: A method in which both shared data and private data are cached and in which just before accessing the shared data, the data in the cache memory is invalidated, thereby ensuring that always the value in the main memory is read and the data in cache is ignored. This method will hereinafter be called "selective cache-invalidate operation method".

There are two types of cache mechanism, namely, write-through cache and write-back cache. In the write-through cache mechanism, the value of the main memory is updated to that of the cache memory by merely executing a store instruction. In the write-back cache mechanism an additional flush instruction is to be executed following the store instruction in order that the value in the memory is updated to that of the cache memory. The sequence of the 'invalidation operation' will depend on the cache mechanism type.

That is, if the cache mechanism is write-through type, as the main memory already holds the latest value, by executing an 'invalidate' instruction prior to reading the shared data, a copy of the value that is in the cache memory can be erased. In contrast, if the cache mechanism is write-back type, the value in the main memory is updated to the value in the cache memory by a 'flush' instruction. In other words, first the value in the main memory is updated, and then the value in the cache is deleted by the 'invalidate' instruction in order to read value in the main memory.

Figure 12:
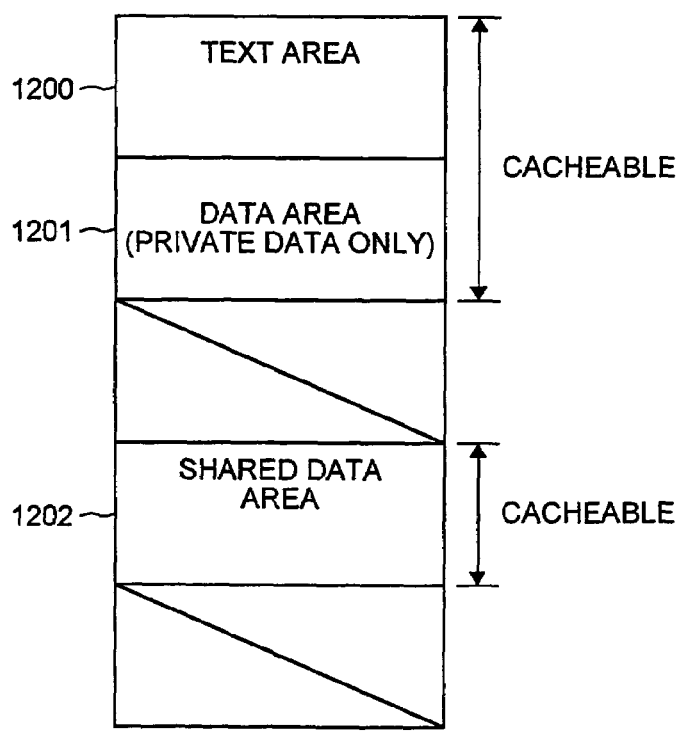
FIG. 12 is an explanatory drawing that shows an example of a memory map in the case in which cache consistency is preserved using a selective cache-invalidate operation method.

FIG. 12 is an explanatory drawing that shows an example of a memory map in the case in which cache consistency is preserved using the selective cache-invalidate operation method. A text area 1200 holds instruction strings of a program, a data area 1201 mainly holds private data from amongst the data that can be read/written from the program, and a shared area 1202 holds the shared data. All these three areas are cache target areas.

A third embodiment of the present invention explained below is an embodiment in which cache consistency is preserved in a shared memory multiprocessor system using this selective cache-invalidate operation method. More specifically, this embodiment relates to the process of identifying beforehand shared data when creating a load module of a program, and invalidating the cache just before executing a 'load' instruction of the shared data. The invalidation operation in the case of the write-through cache is carried out by the 'invalidate' instruction, and in the case of write-back cache by the 'flush' instruction followed by the 'invalidate' instruction.

(2) Fundamental Principle of a Distributed Shared Memory Multiprocessor System

FIG. 13 and FIG. 14 show an example of a program based on multiple-program multiple-data programming that is executed by a computer system that employs a distributed shared memory multiprocessor system. FIG. 13 is a sample program executed by the processor element PE #0 and FIG. 4 is a sample program executed by the processor element PE #1. The program passes data from the processor element PE #0 to the processor element PE #1, requests a specific process to be carried out, and receives the result of the request.

In the processor element PE #0, a variable 'input' is read and its value is written to a variable 'in' (FIG. 13 Th0-1). Next, execution of a function Th1 of the processor element PE #1 is specified (FIG. 13, Th0-2). In the processor element PE #1 that receives this request, the variable 'in' is entered in the function Th1, and a function f1 is called. The execution result of the function f1 is written to a variable 'out' (FIG. 14 Th1-1). Subsequently, in the processor element PE #0 the variable 'out' is read and its value is written in a variable 'output' (FIG. 13 Th0-3).

In an actual program, the processor element PE #0, after passing to the processor PE #1 a request for a process, proceeds to a process that is different from that of the processor element PE #1. However, for the sake of simplification, this example only shows the common processes between the processor element PE #0 and the processor element PE #1.

It is not possible to create an executable load module for a source program such as mentioned above in a language processor of conventional technology. For instance, in the program executed by the processor element PE #0 shown in FIG. 13, the variables 'in' and 'out' whose extern is declared are defined in the program executed by the processor element PE #1 shown in FIG. 14. Consequently, the addresses of the variable become indeterminate at the point when the program executed by the processor element PE #0 is linked.

When the program executed by the processor element PE #1 is linked, the address of the variables can be determined. However, only the address in the memory space of the processor element PE #1 is revealed. The physical storage area address in the memory space of the processor element PE #0 that the address in the memory space of the processor element PE #1 points to continues to remain indeterminate.

A fourth embodiment of the present invention explained below is an embodiment that relates to the process of resolution of addresses of common symbols that are included in programs executed by different processors in a distributed shared memory multiprocessor system. In other words, using the formula that is described later, identifying from the address in the memory space of the processor element PE #1 the address in the memory space of the processor element PE #0, and resolving the address of the variables 'in' and 'out' that are left behind as unresolvable symbols in the program executed by the processor element PE #0.

FIG. 15 is an explanatory drawing that shows schematically the status after address resolution is carried out by the invention when the programs shown in FIG. 13 and FIG. 14 are executed. It is evident from the drawing that the variables in and out are substituted by 0x3000 and 0x3004, respectively in the program executed by the processor element PE #0, and by 0x2000 and 0x2004, respectively in the program executed by the processor element PE #1.

In FIG. 15, further, 'text area' represents an area that holds instruction strings of a program, 'data area' holds, from amongst the data read or written from the program, private data. In other words, the 'data area' holds data that cannot be referred or altered by any processor element other than the processor element that executes that program. Such an area is physically located in the local memory of a processor element and cannot be referred or altered by other processor elements.$\leqq$ 'Shared data areas #k' ($0 \leqq k \leqq n$) hold shared data. These shared data areas are physically located in the shared memory of the respective processor elements PE #0 to PE #k, and can be referred or altered from other processor elements.

For instance, the variable 'in' is stored in one location in the shared memory of the processor element PE #1. The address 0x3000 for the processor element PE #0 and the address 0x2000 for the processor element PE #1 are allocated to the same location. Consequently, the value can be referred or altered from either of the processor elements. In this way, data exchange can take place between processor elements via shared memory.

Figure 16:
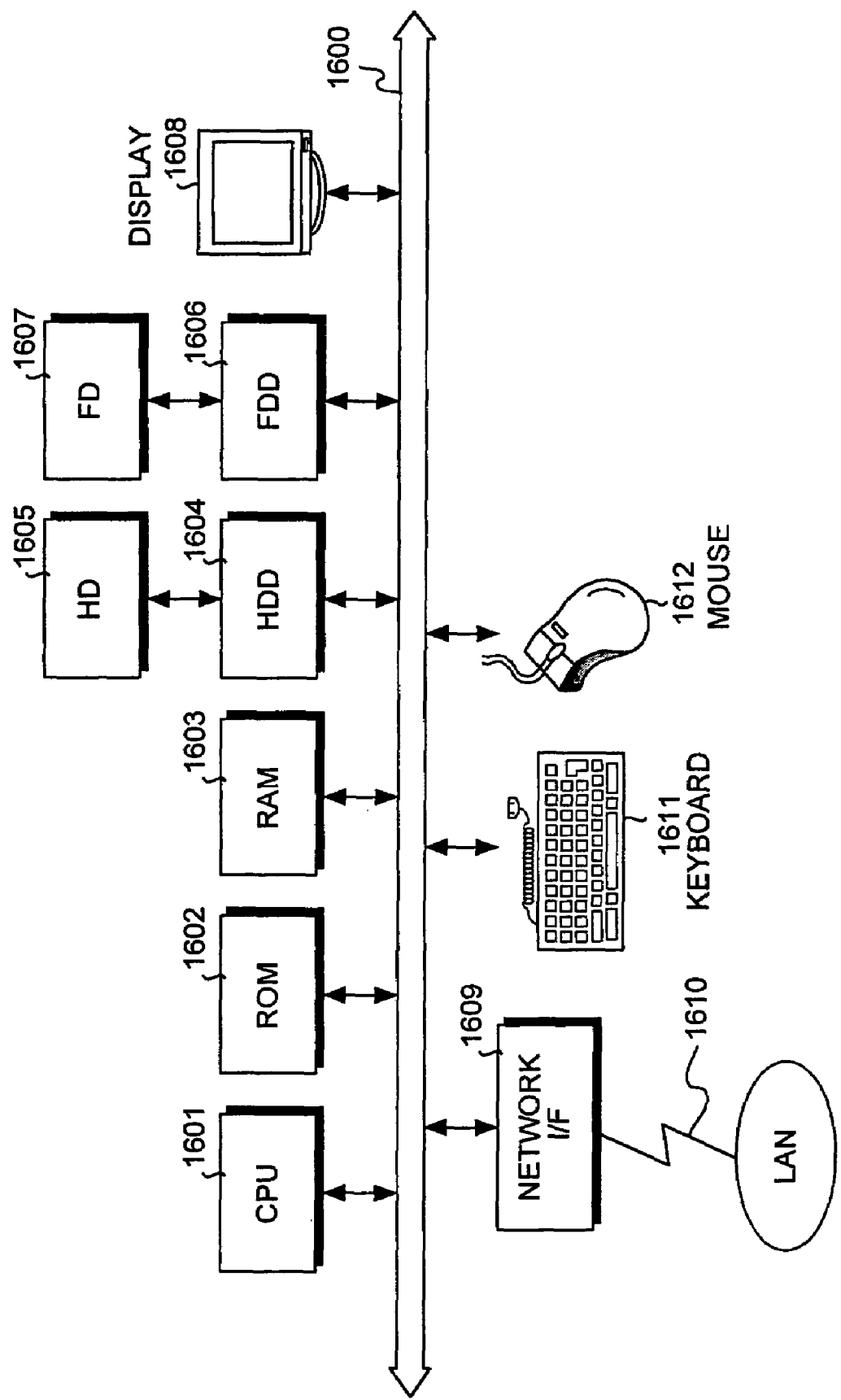
FIG. 16 is a block diagram that shows an example of hardware structure of the load-module creating apparatus according to the first embodiment of the present invention.

FIG. 16 is a block diagram that shows an example of hardware structure of the load-module creating apparatus according to the first embodiment of the present invention.

The load-module creating apparatus includes a central processing-unit (CPU) 1601 that controls the entire load-module creating apparatus, a read-only memory (ROM) 1602 that stores a boot program, and the like, a random-access memory (RAM) 1603 that acts as a work area for the central processing-unit 1601, a hard-disk drive (HDD) 1604 that controls reading data from or writing data to a hard disk (HD) 1605 according to the control by the central processing-unit 1601, and the hard disk (HD) 1605 that stores the data written based on the control by the hard-disk drive 1604.

A floppy-disk drive (FDD) 1606 reads from and writes to a floppy disk (FD) 1607 according to the control by the central processing-unit 1601. The floppy disk 1607 stores the data written or enables reading of stored data by a magnetic head of the floppy-disk drive 1606 based on the control by the floppy-disk drive 1606. Removable storage medium, apart from the floppy disk 1607, may be in the form of a CD-ROM, CD-R, CD-RW, MO, digital versatile disk (DVD), memory card, etc.

A display 1608 displays cursors, windows, text, images and may, for instance, be a cathode-ray tube (CRT) display, thin-film transistor (TFT) liquid crystal display, plasma display, etc. A network interface 1609 connects to a local area network (LAN) through an ethernet (R) cable 1610 and enables data transfer between the local area network and the load-module creating apparatus.

A keyboard 1611 is provided with keys to facilitate input of characters and numbers and to enter data into the apparatus. Input may also be done using a touch panel type input pad or a numeric keypad. A mouse 1612 is provided for moving the cursor or for range selection. A trackball, joystick, cross key, jog dial etc. may also serve the purpose if they are provided with the functions of a pointing device. All the parts mentioned above are connected by a bus or a cable 1600.

Figure 17:
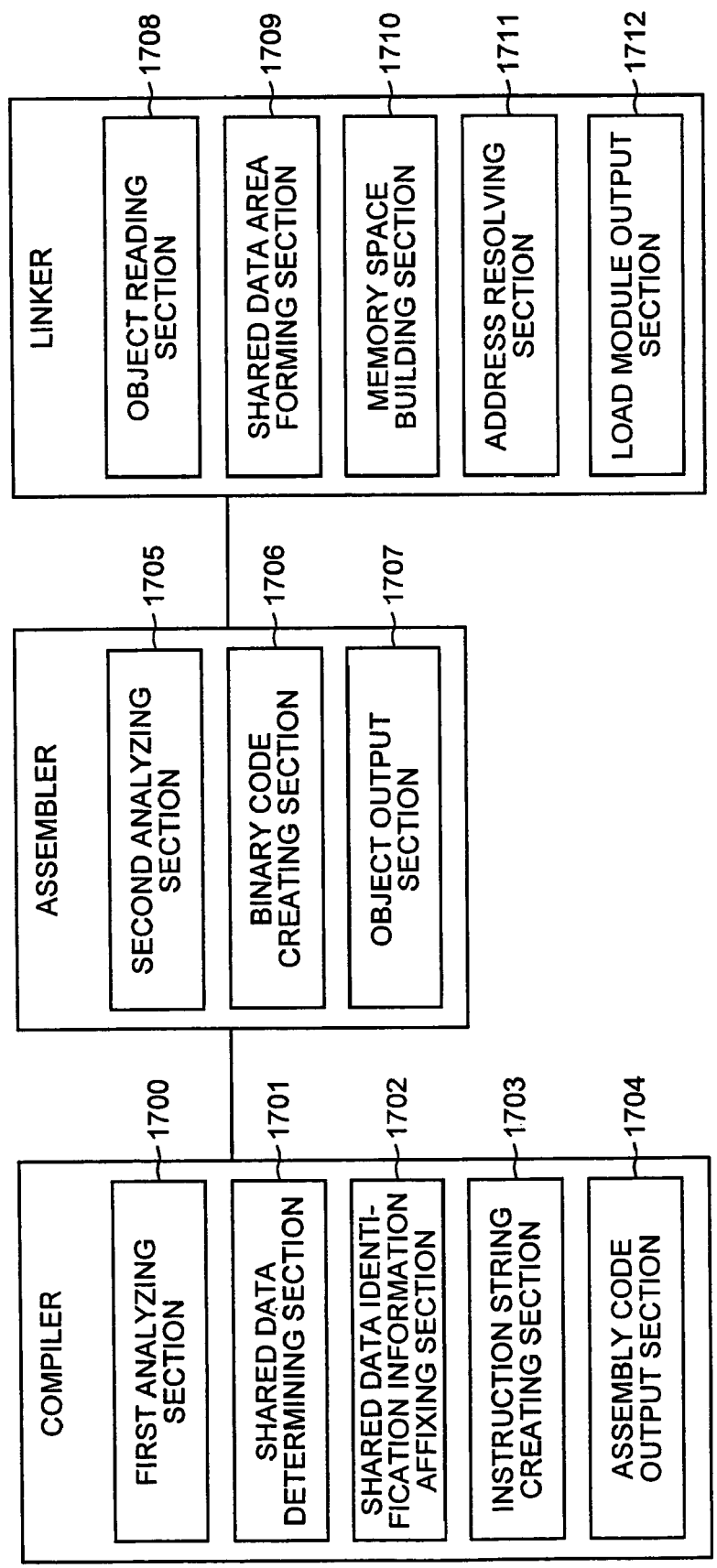
FIG. 17 is a block diagram that shows the functional structure of the load-module creating apparatus according to the first embodiment.

FIG. 17 is a block diagram that shows the functional structure of the load-module creating apparatus according to the first embodiment. The functions of each sections are implemented by programs stored in the hard disk 1605, and floppy disk 1607 shown in FIG. 16 and read into the random-access memory 1603 by the central processing-unit 1601. The programs are, in essence, a compiler, an assembler, and a linker.

The functions of sections 1700 to 1704 are implemented by the compiler, the functions of sections 1705 to 1707 are implemented by the assembler, and the functions of sections 1708 to 1712 are implemented by the linker. The functions of each section are explained next with the help of a flowchart shown in FIG. 18.

Figure 18:
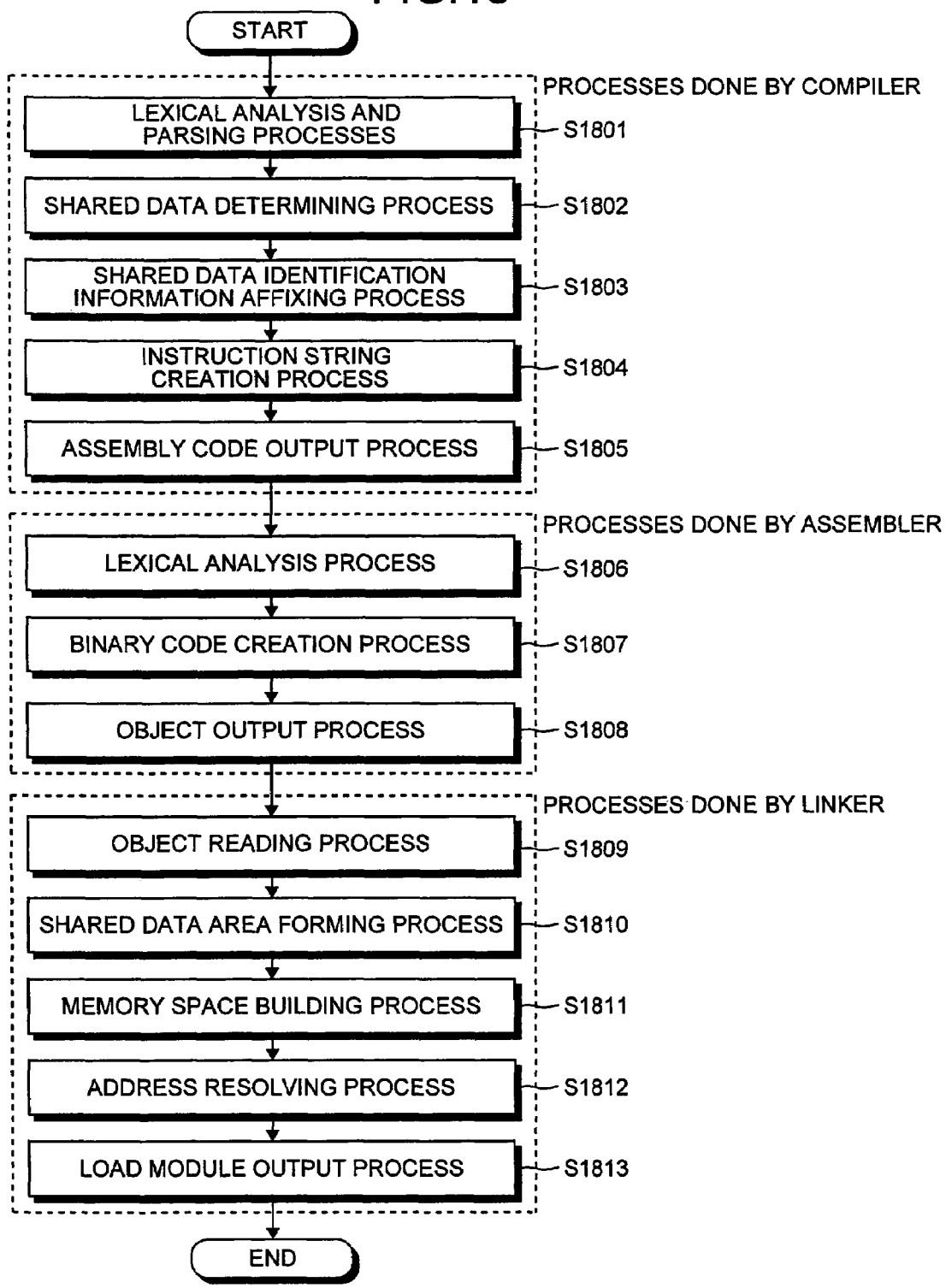
FIG. 18 is a flowchart that shows the sequence of steps in the process of a load-module creation in the load-module creating apparatus according to the first embodiment.

The flowchart in FIG. 18 shows the sequence of steps in the process of a load-module creation in the load-module creating apparatus according to the first embodiment.

In the load-module creating apparatus, first the compiler is activated. A first analyzing section 1700 implemented by the compiler reads a source code of a specified program, carries out lexical analysis and parsing of the source code, and converts the program into an internal representation of the compiler (step S1801).

Next, a shared data determining section 1701 determines, by scanning the internal representation of the compiler, if individual data included therein is shared among the different processes of the program. When a data is determined to be a shared data, an identifier to indicate that the data is shared is affixed to the data (step S1802).

Next, a shared data identification information affixing section 1702 scans the internal representation of the compiler, finds the data with the identifier affixed in step S1802, and for all the shared data thus found, affixes as an identification information a prefix to the data name (step S1803). The prefix may for instance be '_shr_'.

Next, an instruction string creating section 1703 creates, based on the internal representation of the compiler, instruction strings that run the program and adds the instruction strings to the internal information of the compiler (step S1804).

Next, an assembly code output section 1704 outputs, based on the internal representation of the compiler and the added instruction strings, an assembly code of the program (step S1805). This completes the process of conversion of the source code to the assembly code by the compiler.

Next, the assembler is activated in the load-module creating apparatus. A second analyzing section 1705 implemented by the load-module creating apparatus reads the assembly code output by the assembly code output section 1704 of the compiler in step S1805, carries out lexical analysis of the assembly code and converts it into the internal representation of the assembler (step S1806).

Next, a binary code creating section 1706 creates, based on the internal representation of the assembler, a binary code (that includes an instruction code), and adds the binary code to the internal information of the assembler (step S1807).

Next, an object output section 1707 outputs, based on the internal representation of the assembler and the added binary code, an object of the program (step S1808). This completes the process of conversion of the assembly code to the object by the assembler.

Next, the linker is activated in the load-module creating apparatus. An object reading section 1708 implemented by the linker reads as an internal representation of the linker the object output by the object output section of the assembler in step S1808 (step S1809).

Next, a shared data area forming section 1709 searches the internal representation of the linker for data with the shared data identification information (such as the prefix shr), forms an area (shared data area 1102 in FIG. 11) that includes only shared data, and adds it as the internal representation of the linker (step S1810).

Next, a memory space building section 1710 creates an area (data area 1101 in FIG. 11) that includes only the private data that is left behind in the internal representation of the linker and another area (text area 1100 in FIG. 11) that includes only the instruction strings (step S1811).

Next, an address resolving section 1711 carries out resolution of the address of each of the memory areas, namely, the text area 1100, the data area 1101 and the shared data area 1102 of the internal representation of the linker (step S1812).

Next, a load module output section 1712 outputs, based on the internal representation of the linker, a load module for the program (step S1813). This completes the assembling of the object code by the linker and the conversion of source code to the load module.

According to the first embodiment, data that are shared between plural processes of the program are identified as shared data by affixing an identification information (for instance, a prefix like '_shr_'). When linking, first only the shared data is extracted to form the shared data area 1102. Next, private data is extracted to form the data area 1101. Then with the remaining instruction strings, the text area 1100 is formed.

In this way, by segregating shared data and private data in different memory spaces, that is, by creating the shared data area 1102 and the data area 1102, and by placing shared data in a non-cacheable area, and private data area in a cache target area, distribution of shared data in the cache memory of different processors can be avoided and cache consistency can be preserved.

In the first embodiment explained above, shared data needs to be marked as shared before the linker forms the memory space. This is advancement over conventional technology in which the linker cannot segregate shared data and private data. That is, in the conventional technology, data is assembled in the same sequence as in the source code. Therefore, shared data is not exclusively separated out in step S1810. Consequently, in the following step S1811, an area is formed which includes both shared and private data.

However, in conventional technology there is provided a function whereby data is segregated section-wise and placed in different memory areas as blocks. In the second embodiment explained next, by using a psuedo-instruction of section specification of the assembler, that is, by specifying a shared data section as section A, a private data section as section B, shared data and private data can be segregated in different blocks even in the memory space building process of the linker of conventional technology.

Figure 19:
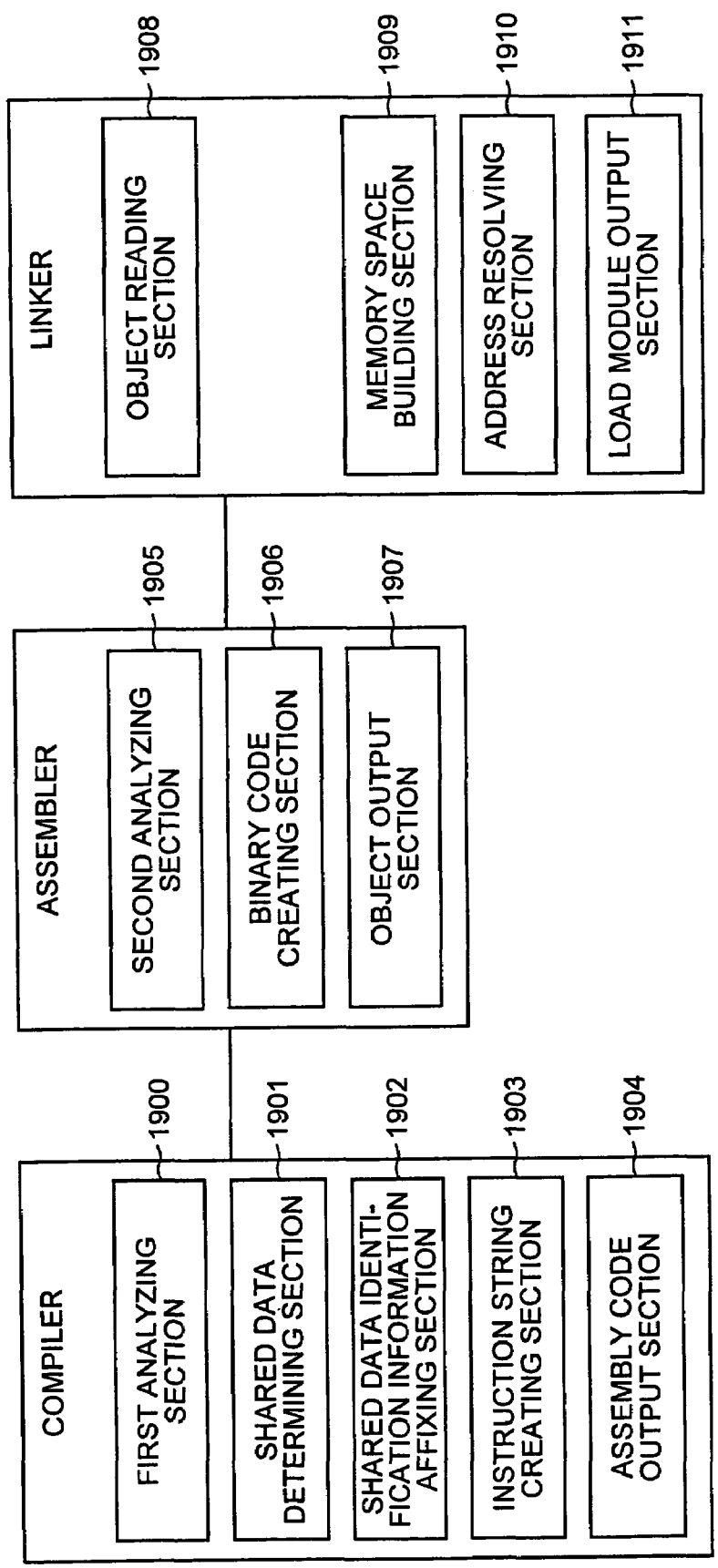
FIG. 19 is a block diagram that shows the functional structure of the load-module creating apparatus according to the second embodiment.
Figure 20:
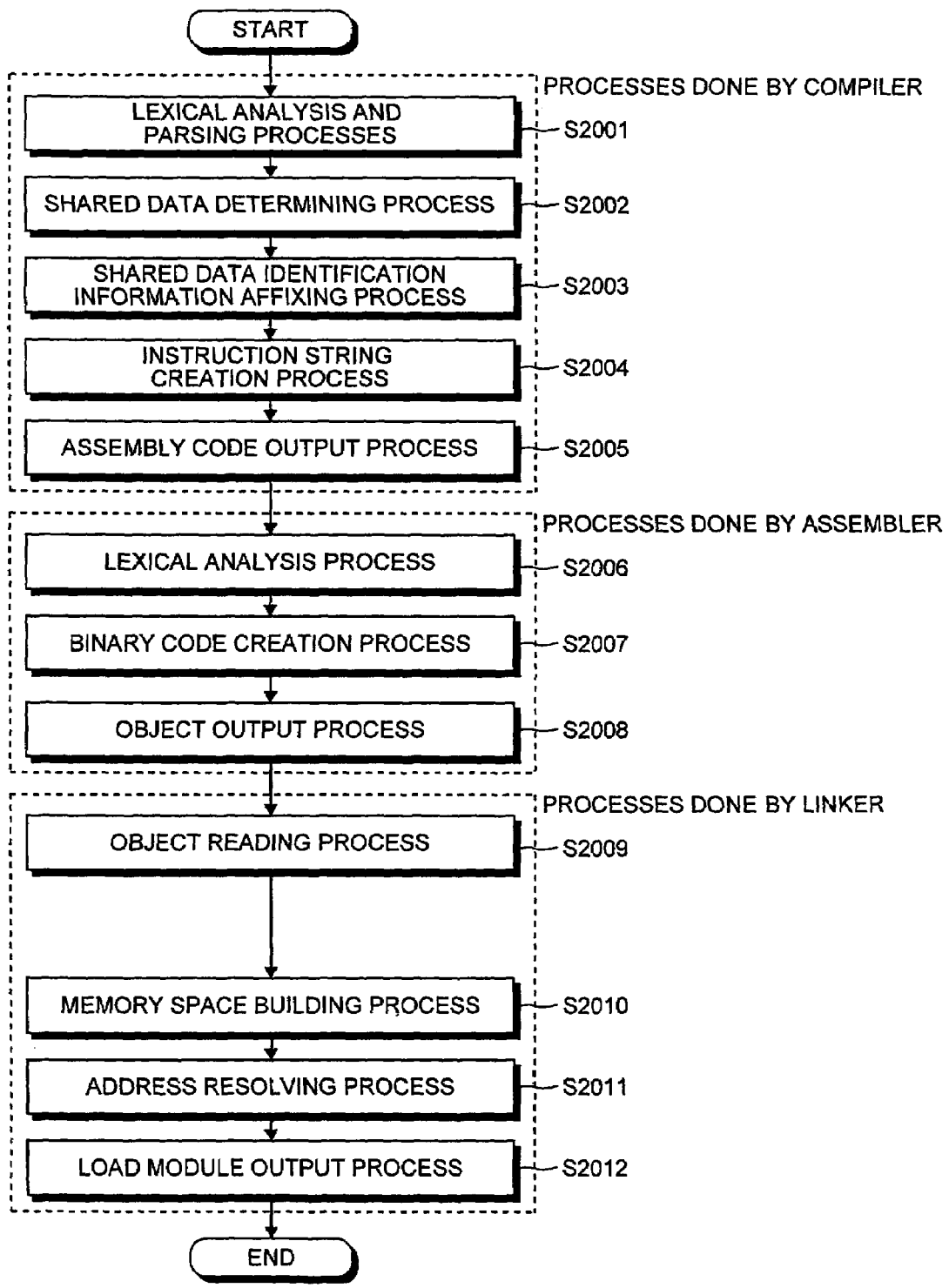
FIG. 20 is a flowchart that shows the sequence of steps in the process of a load-module creation in the load-module creating apparatus according to the second embodiment.

The hardware structure of the load-module creating apparatus according to the second embodiment is identical to that of the first embodiment shown in FIG. 16 and hence its description is omitted. FIG. 19 is a block diagram that shows the functional structure of the load-module creating apparatus according to the second embodiment. FIG. 20 is a flowchart that shows the sequence of steps in the process of load-module creation in the load-module creating apparatus according to the second embodiment. The difference between the first and the second embodiments is that, the second embodiment does not have the shared data area forming section 1709 shown in FIG. 17 and consequently, the step S1810 shown in FIG. 18 is absent in FIG. 20.

Another difference is, in the first embodiment, the shared data identification information affixing section 1702 affixes a specific prefix to the shared data in step S1803. However, in the second embodiment, the shared data identification information affixing section 1902 inserts a section specification pseudo-instruction such as '.sect "shared data"' just before the shared data in step S2003.

The memory space building section 1909 of the second embodiment, in step S2010, collects data belonging only to the 'shared data' section to create the shared data area 1102, data in the remaining section to create the data area 1101, and the instruction strings to create the text area 1100.

According to the second embodiment, by segregating shared data and private data beforehand by the section specification pseudo-instruction of the assembler, the shared data can be placed in a non-cacheable area and the private data in cache target area. Consequently distribution of shared data in the cache memory of different processors can be avoided and cache consistency can be preserved.

In the first embodiment and the second embodiment explained above, a non-cacheable area is provided in the memory space of processors and shared data is placed in the non-cacheable area. Consequently, the shared data does not get copied in the cache memory. However, in a third embodiment of the present invention explained in detail below, shared data is also cached. However, only when accessing the shared data, the cache is invalidated and the data is always read from the main memory.

Figure 21:
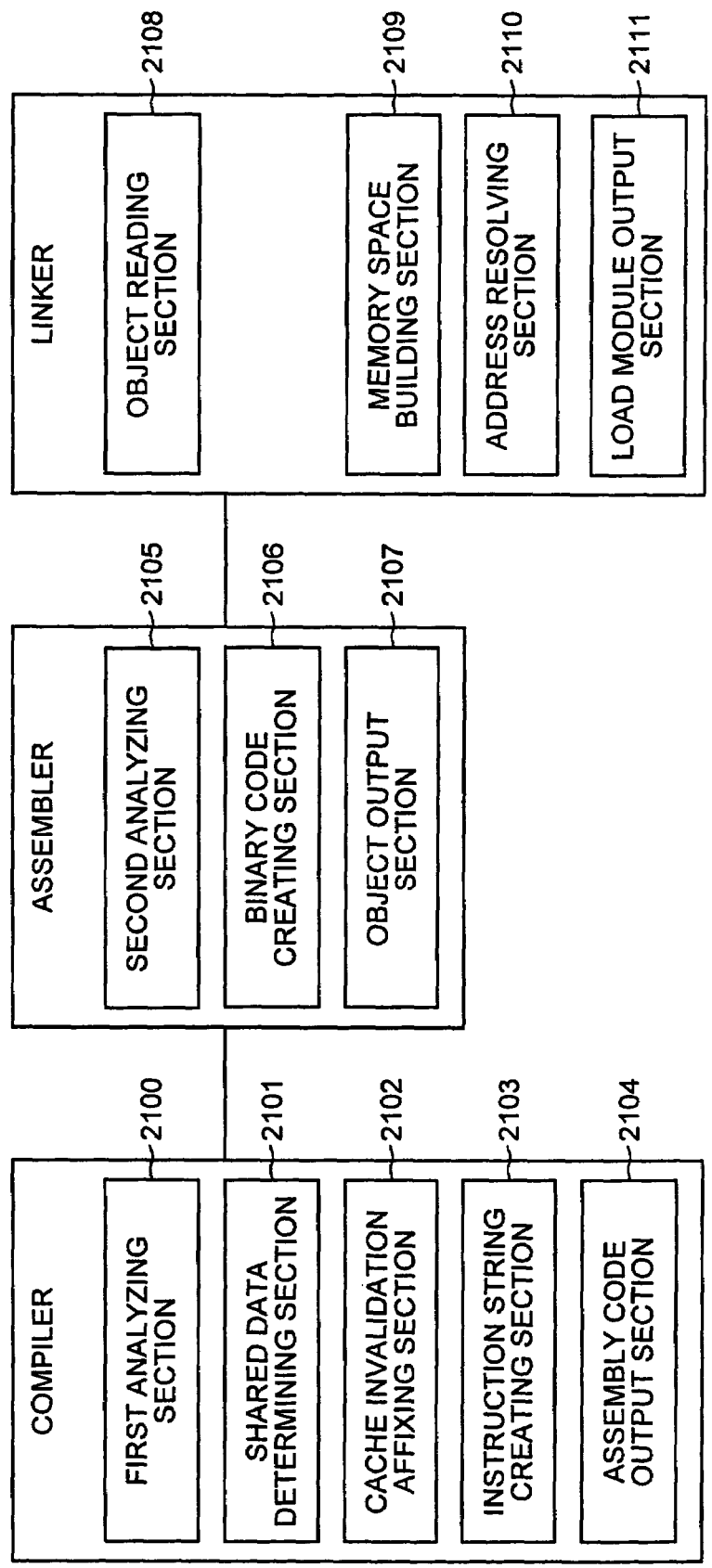
FIG. 21 is a block diagram that shows the functional structure of the load-module creating apparatus according to the third embodiment.
Figure 22:
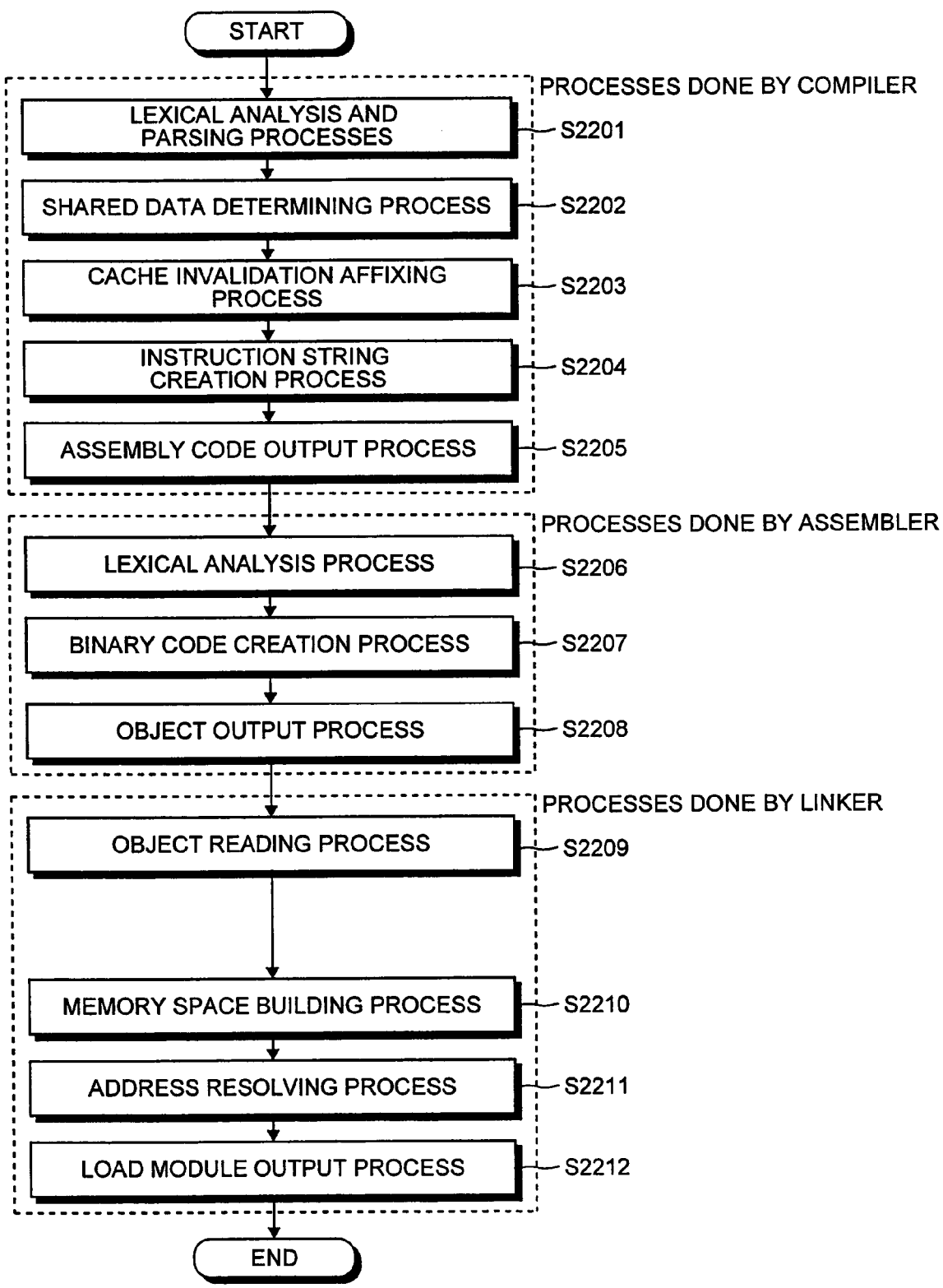
FIG. 22 is a flowchart that shows the sequence of steps in the process of a load-module creation in the load-module creating apparatus according to the first embodiment.

The hardware structure of the load-module creating apparatus according to the third embodiment is identical to that of the first embodiment shown in FIG. 16 and hence its description is omitted. FIG. 21 is a block diagram that shows the functional structure of the load-module creating apparatus according to the third embodiment. FIG. 22 is a flowchart that shows the sequence of steps in the process of load-module creation in the load-module creating apparatus according to the third embodiment. The difference between the first and the third embodiments is that, the third embodiment does not have a function section corresponding to the shared data area forming section 1709 shown in FIG. 17. Consequently, there is no step in FIG. 22 that is equivalent to step S1810 in FIG. 18.

Another difference is, in the third embodiment, a cache-invalidate operation affixing section 2102 is provided as shown in FIG. 21 instead of the shared data identification information affixing section 1702 of first embodiment shown in FIG. 17. Accordingly, in FIG. 22, step S2203 is a step in which cache-invalidate operation affixing process by the cache-invalidate operation affixing section 2102 takes place instead of affixing of an identifier.

The cache-invalidate operation affixing is carried out for write-through cache by inserting an 'invalidate' instruction, and for write-back cache by inserting a 'flush' instruction followed by the 'invalidate' instruction.

According to the third embodiment, even though both shared data and private data are cached, the copy of the shared data in the cache memory of the processors is never actually used.

In other words, private data is accessed by accessing its copy in the cache memory. However, when it comes to shared data, the 'invalidate' instruction is executed which invalidates the copy of the data in the cache memory of the processor and ensures that always the main memory is accessed for shared data. As a result, all the processors, when accessing the shared data, access the same address in the main memory, thereby maintaining cache consistency.

The first to third embodiments relate to preservation of cache consistency in a computer system that employs a shared-memory multiprocessor system. A fourth embodiment of the present invention explained next relates to address resolution of programs for each processor in a computer system employing a distributed shared memory multiprocessor system which is a type of distributed-memory multiprocessor.

Figure 23:
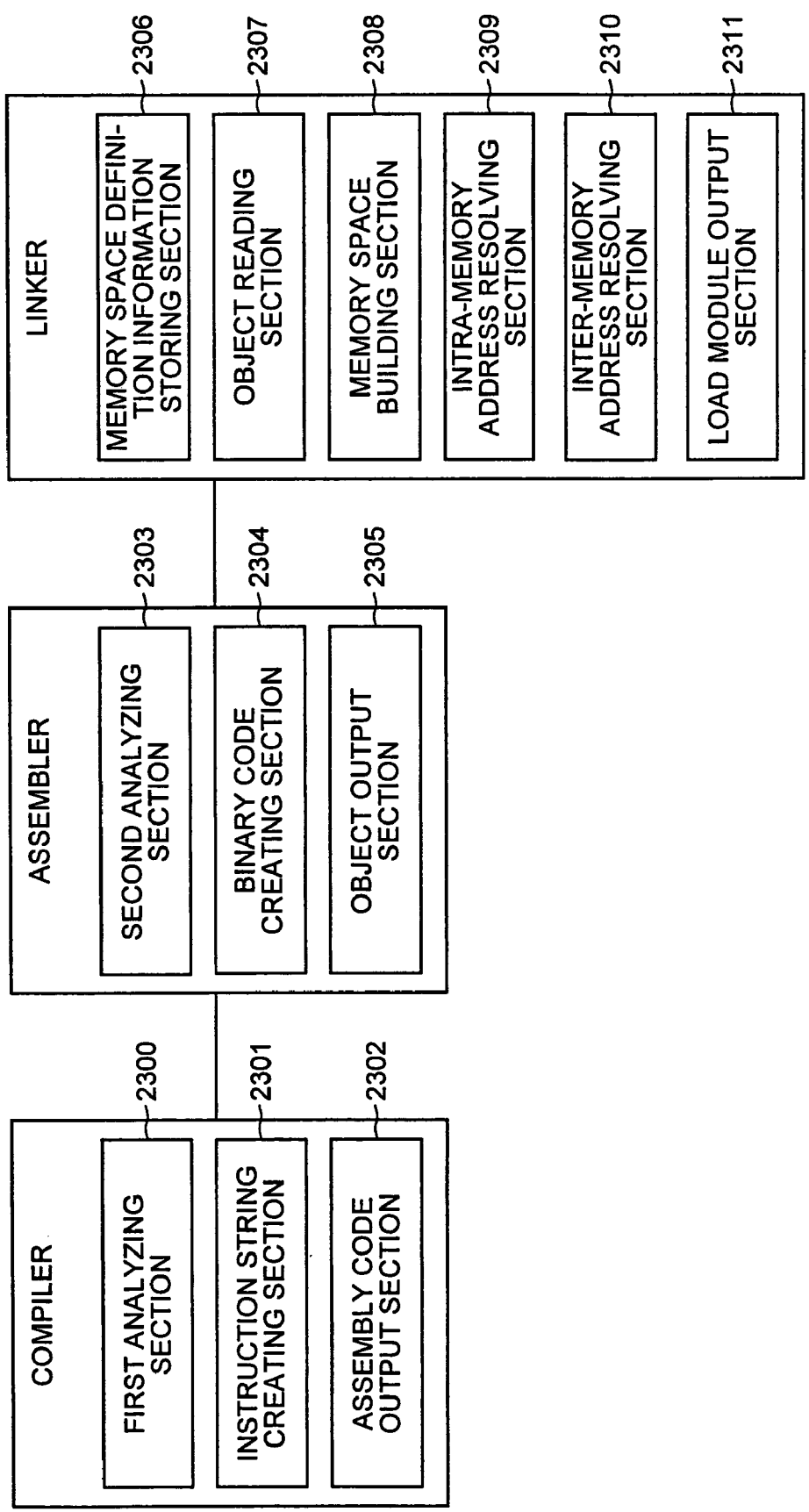
FIG. 23 is a block diagram that shows the functional structure of the load-module creating apparatus according to the fourth embodiment.

The hardware structure of the load-module creating apparatus according to the fourth embodiment is identical to that of the first embodiment shown in FIG. 16 and hence its description is omitted. FIG. 23 is a block diagram that shows the functional structure of the load-module creating apparatus according to the fourth embodiment. The function sections are implemented by programs stored in the hard disk 1605, floppy disk 1607, and the like shown in FIG. 16 and read into the random-access memory 1603 by the central processing-unit 1601. The programs are, in essence, a compiler, an assembler, and a linker.

The function sections 2300 to 2302 are implemented by the compiler, and convert a source code of a program to an assembly code. The function details are the same as for a compiler of conventional technology.

In other words, a first analyzing section 2300, which is a function section that carries out the process in step S501 shown in FIG. 5, reads the source code of the specified program, carries out lexical analysis and parsing of the source code, and converts the program into an internal representation of the compiler.

Next, an instruction string creating section 2301, which is a function section that carries out the process in step S502 shown in FIG. 5, based on the internal representation, creates instruction strings that run the program, and adds the instruction strings to the internal information of the compiler.

Next, an assembly code output section 2302, which is a function section that carries out the process in step S503 shown in FIG. 5, based on the internal representation of the compiler and the added instruction strings, outputs an assembly code of the program.

The function sections 2303 to 2305 are implemented by the assembler and convert the assembly code output from the compiler to an object. The function details are the same as for an assembler of conventional technology.

In other words, a second analyzing section 2303, which is a function section that carries out the process in step S504 shown in FIG. 5, reads the assembly code output from the assembly code output section 2302 of the compiler, carries out lexical analysis of the assembly code, and converts the program into an internal representation of the assembler.

Next, a binary code creating section 2304, which is a function section that carries out the process in step S505 shown in FIG. 5, based on the internal representation of the assembly, creates a binary code (that includes an instruction code) and adds the binary code to the internal information of the assembler.

Next, an object output section 2305, which is a function section that carries out the process in step S506 shown in FIG. 5, based on the internal representation of the assembly and the added binary code, outputs an object of the program.

The function sections 2306 to 2311 are implemented by the linker and output an executable load module by linking the objects that are output from the assembler. Only the function section 2306 is explained here. The function sections 2307 to 2311 are explained later with reference to a flowchart.

FIG. 24 is an explanatory drawing that shows the contents of memory space definition information held in a memory space definition information storing section 2306. The memory space definition information is information that defines the address of the memory areas like the text area, data area, etc., in the memory space.

For instance, the addresses in the area from 0x0000 to 0x0fff in the memory space of the processor element PE #0 physically exist in the local memory of the processor element PE #0 and are occupied by the 'text area' of the program executed by the processor element PE #0. Similarly, the addresses in the area from 0x0000 to 0x0fff in the memory space of the processor element PE #1 physically exist in the local memory of the processor element PE #1 and are occupied by the 'text area' of the program executed by the processor element PE #1.

The area that has addresses 0x3000 to 0x3fff in the memory space of the processor element PE #0 and the area that has addresses 0x2000 to 0x2fff are identical and physically exist in the shared memory of the processor element PE #1. These areas or addresses are occupied by 'shared data area PE #1', that is, shared data of the processor element PE #1 that can also be referred or altered from the processor element PE #0.

Figure 25:
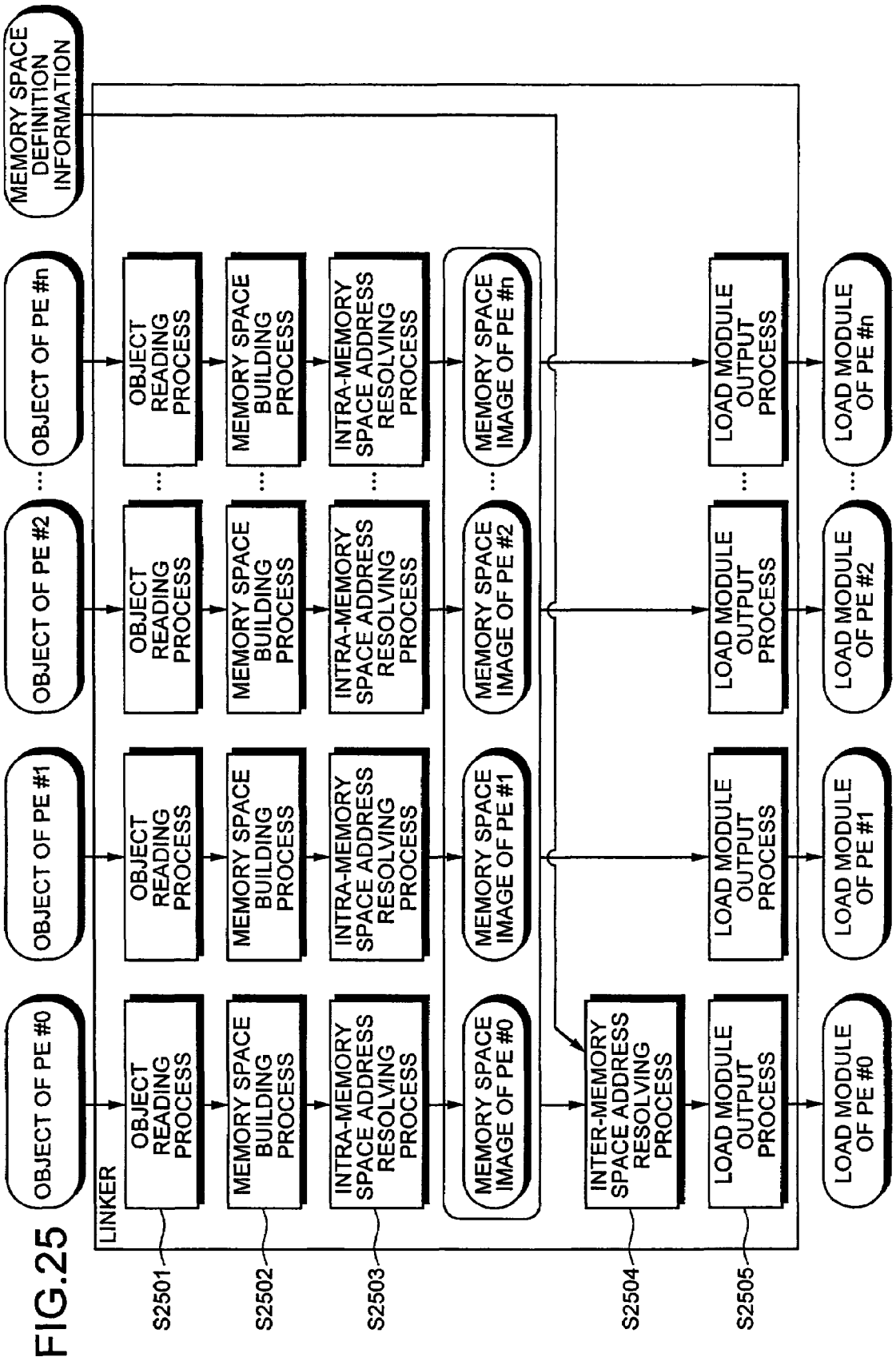
FIG. 25 shows a flowchart that explains the process steps of creation of a load module in the load-module creating apparatus according to the fourth embodiment of the present invention.

FIG. 25 shows a flowchart that explains the process steps of creation of a load module for the programs shown in FIG. 13 and FIG. 14 in the load-module creating apparatus according to the fourth embodiment. Since the processes in the compiler and the assembler are identical to those in conventional technology, only the process steps in the linker are explained in the flowchart.

First, an object reading section 2307 implemented by the linker reads as an internal representation of the linker, from among the objects output from the object output section 2305 of the assembler, an object for the processor element PE #k (0≦k≦n) (step S2501).

Next, a memory space building section 2308 creates memory areas ('text area', 'data area', etc.) in the processor element PE #k, and adds the memory areas as an internal representation of the linker (step S2502).

Next, an intra-memory space address resolving section 2309 resolves the address of all the memory areas in the memory space of the processor element PE #k. All the processes up to the present process are repeated for the processor elements PE #0 (k=0) to PE #n (k=n).

Next, an inter-memory space address resolving section 2310 refers to the memory space image of all the processor elements that have undergone the above processes and the memory space definition information shown in FIG. 24, and resolves the addresses of symbols that remain unresolved in step S2503 that straddle two memory spaces (step S2504).

The process of resolution of an address that straddles two memory spaces is explained with the example shown in FIG. 13. To resolve the address of the variables 'in' and 'out' in the program executed by the processor element PE #0 that are declared in the program executed by the processor element PE #1, the address of the variables in the memory space of the processor element PE #0 is computed from the address in the memory space of the processor element PE #1.

The following expression is used for computing an address in a processor element of a symbol from the address of another processor element.

symbol address = self base address + offset

However, offset = other's processor element symbol address − other's processor element base address The address of the variable 'out' in the processor element PE #0 therefore is as follows:

offset = 4 (=0x2004 − 0x2000).

Therefore symbol address = 0x3004 (=0x3000 + 0x0004).

In other words, as is evident from the memory space definition information shown in FIG. 24, the initial address of the shared data in the processor element PE #1 is different from the address in the memory area of at least the processor element PE #0. Therefore, the address of the variable 'out' in the processor element PE #0 can be assigned by adding the offset of the variable 'out' to the initial address.

Since unresolved symbols are not expected to exist after address resolution by the intra-memory space address resolving section 2309 and the inter-memory space address resolving section 2310, a load module output section 2311 outputs, based on the internal representation of the linker, a load module for the program executed by the processor element PE #k (step S2505). The load module is output for all the processor elements from PE #0 (k=0) through PE #n (k=n). This completes the process of conversion of the source of all the processor elements to load modules.

Figure 1:
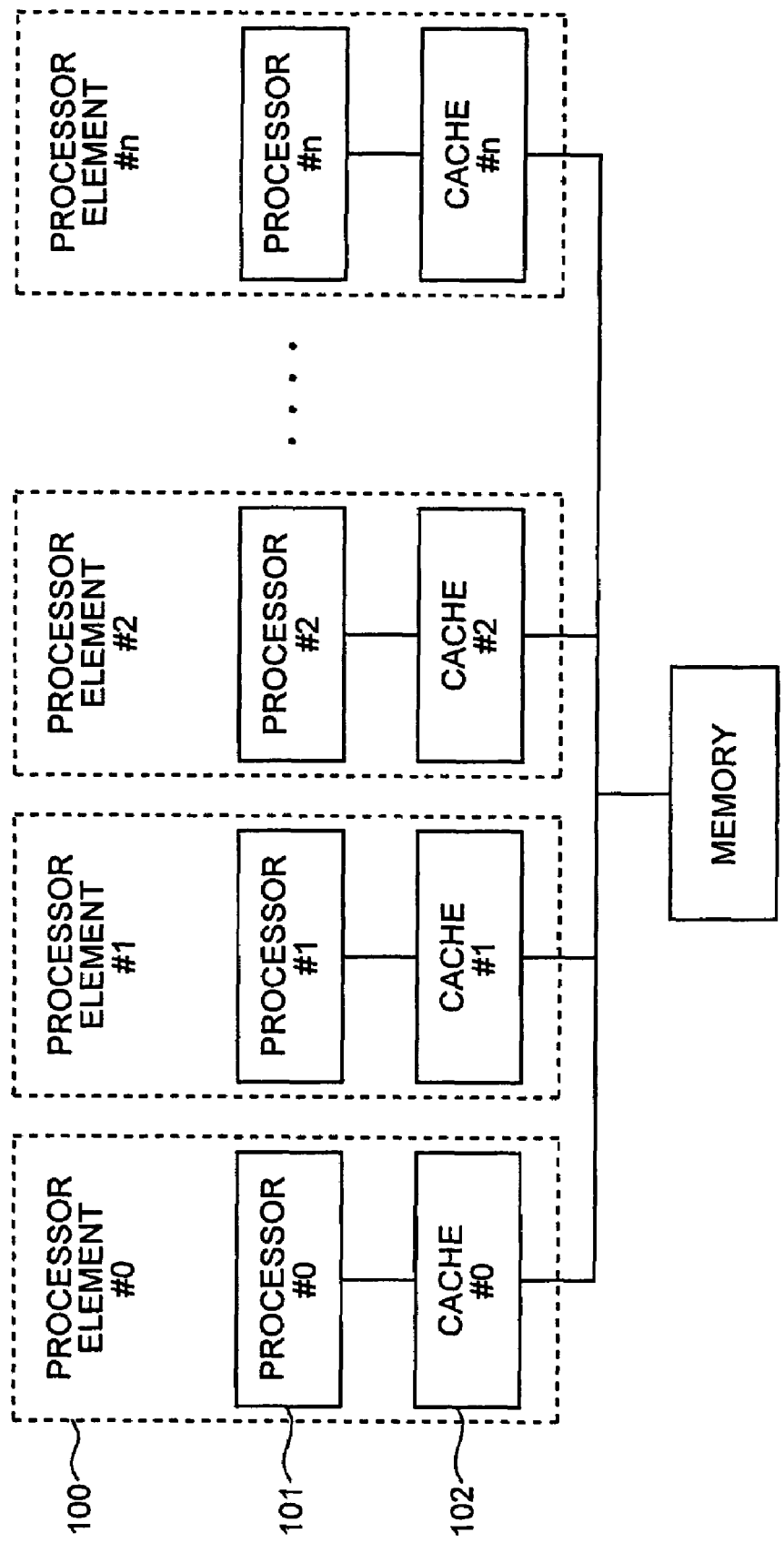
FIG. 1 is a schematic diagram of a computer system that employs a shared-memory multiprocessor system.
Figure 2:
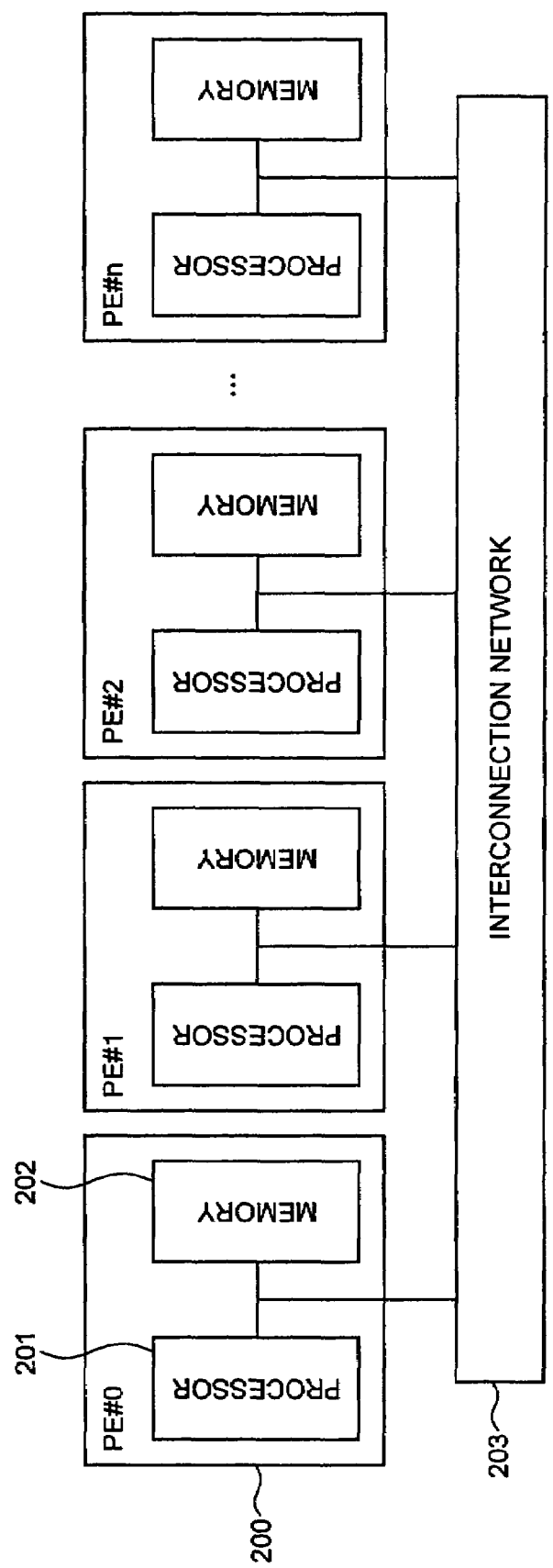
FIG. 2 is a schematic diagram of a computer system that employs a distributed-memory multiprocessor system.
Figure 3:
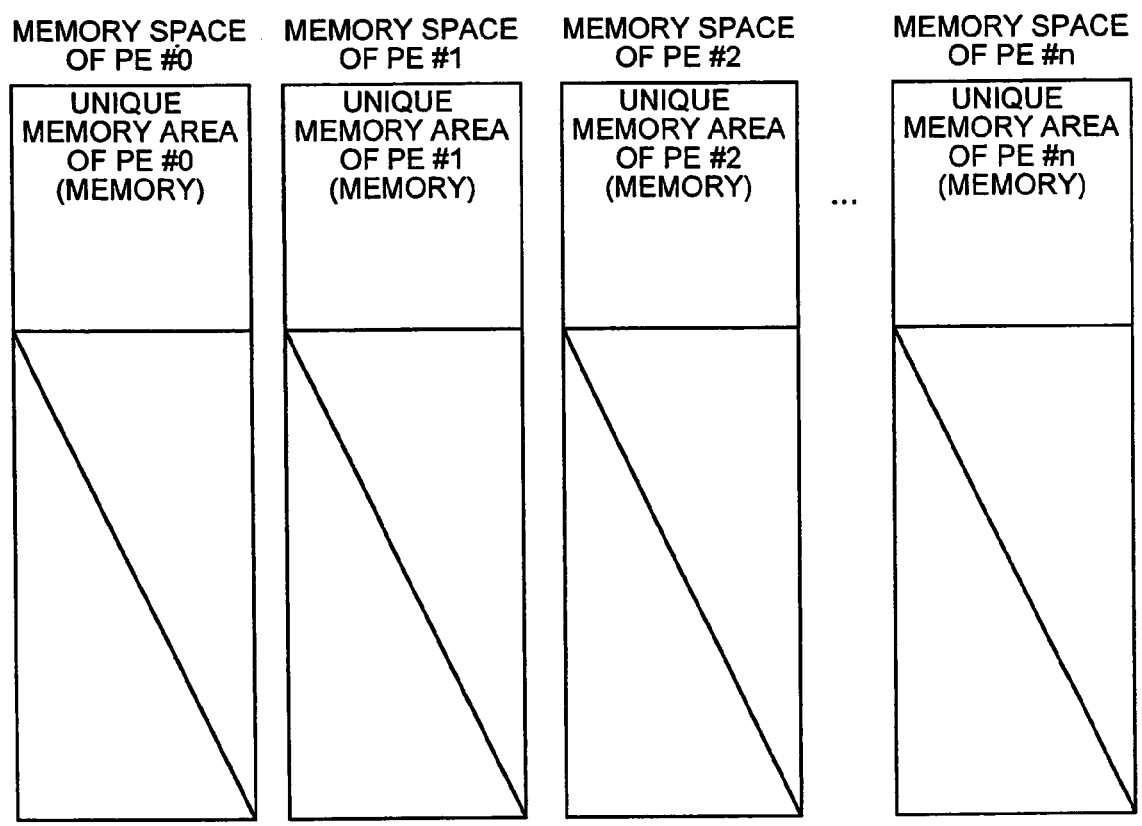
FIG. 3 is an explanatory drawing that shows an example of memory space definition in a computer system that employs a distributed memory multiprocessor system.
Figure 8:
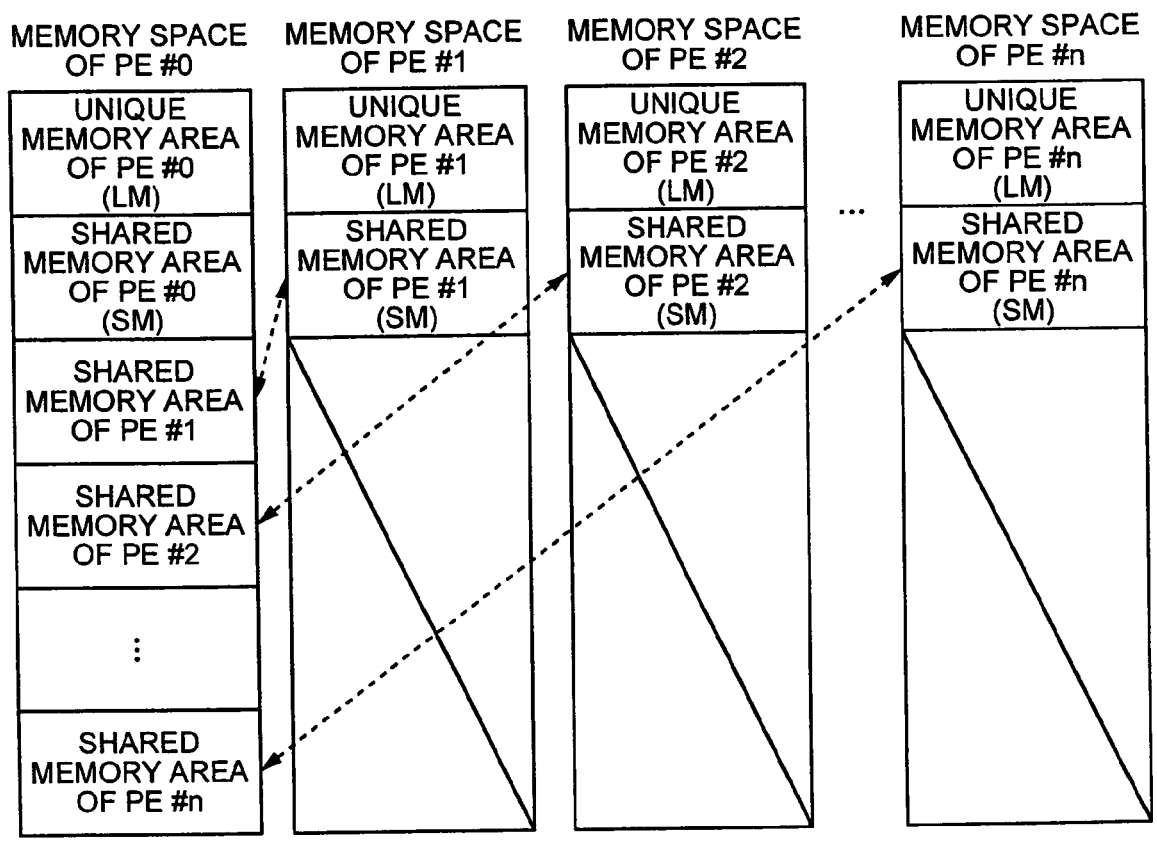
FIG. 8 is an explanatory drawing that shows an example of memory space definition in the distributed shared-memory microprocessor system.

In the example of memory space definition shown in FIG. 8, only the processor element PE #0 can refer or alter the variables present in the memory of the other processor elements. (As the memory of other processor elements are not physically allocated in the memory space of the processor elements PE #1 through PE #n, these processor elements cannot refer or alter the variables in the memory of other processor elements). Consequently, when linking the programs executed by the processor elements PE #1 through PE #n, the address resolution step that takes place in step S2504 is not required since no unresolved symbols are expected to remain after step S2503.

Processor elements other than the processor element PE #0 may be enabled to refer or alter data in other processor elements (FIG. 8 is illustrative only).

Figure 26:
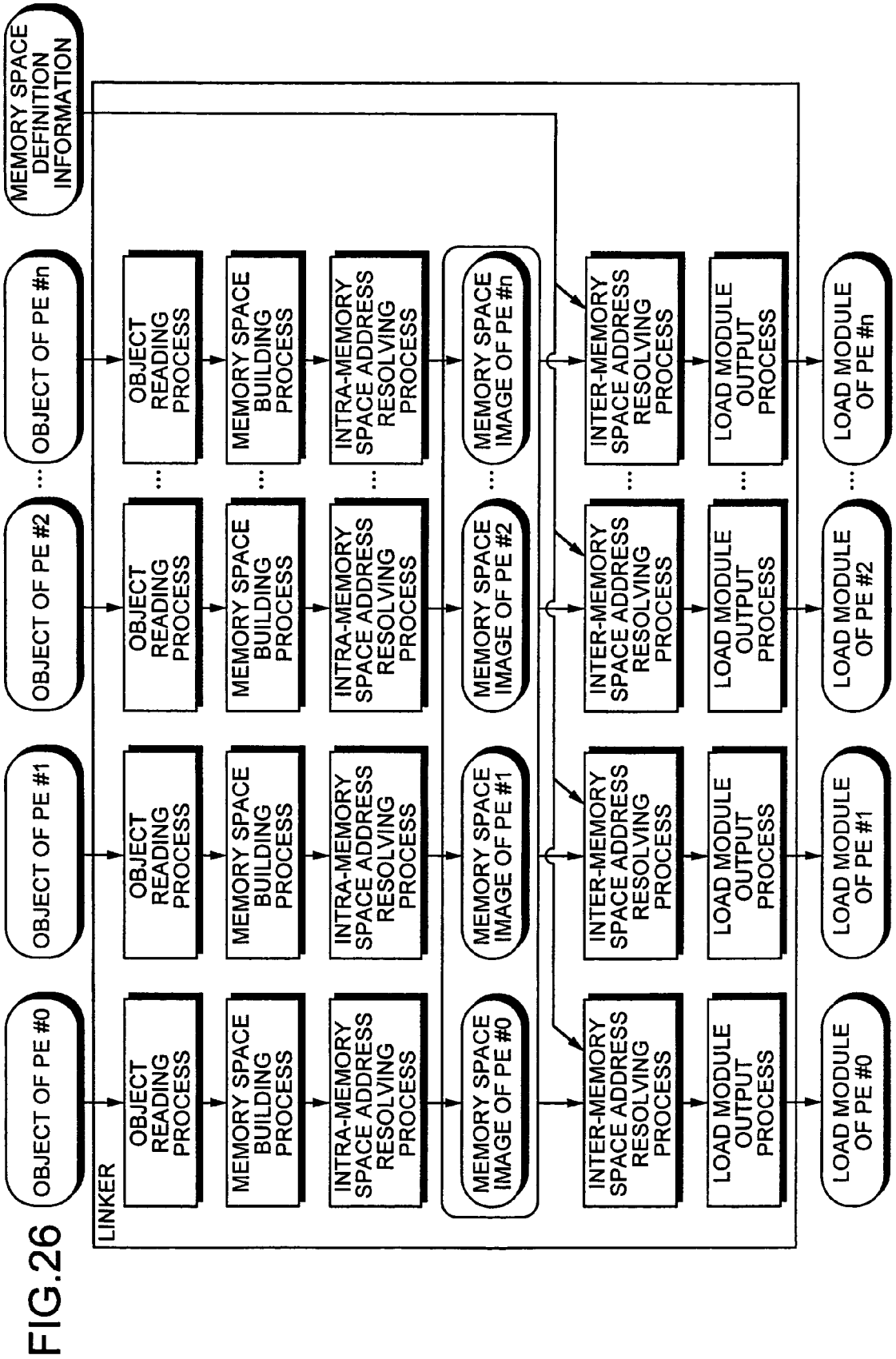
FIG. 26 shows a flowchart that explains the process steps of creation of a load module in the load-module creating apparatus according to the fourth embodiment of the present invention.

In that case, as symbols that cannot be resolved by step S2503 alone may arise, the process of address resolution step of S2504 needs to be carried out for each of the processor elements PE #1 through PE #n, as shown in FIG. 26. The same processes carried out for the processor element PE #0 is carried out for the processor elements PE #1 through PE #n. The only difference is, in FIG. 26 step S2504 is carried out for each processor element which is not required in the case when only the processor element PE #0 is enabled to access the other processor elements, as shown in FIG. 25.

According to the fourth embodiment, load modules of programs based on multiple-program multiple-data can be created for a computer system employing distributed shared memory multiprocessor system. Putting it another way, since it is possible to create a program for a computer system employing distributed shared memory multiprocessor system using multiple-program multiple-data programming, each processor element needs memory space enough for the part of the program to be executed by it. Consequently, the chip memory can be considerably reduced.

The load-module creation methods in the first to fourth embodiments are realized by execution of programs (a compiler, an assembler, and a linker) that are pre-installed on a personal computer or a workstation. The programs may be stored on any storage medium such as a hard disk, floppy drive, CD-ROM, magneto optic disk, digital versatile disk, etc. which a computer can read from. The storage medium may also be a means of distribution. Another means of distribution may be a network, such as the internet.

Thus, when executing the load module created by the first to third embodiment of this invention, the data shared between plural processes of a program is either not copied to the cache memory of the processors, or if copied, the cache is invalidated when the program is loaded. In this way, always the main memory is accessed when referring or altering a value. Consequently, the consistency of the cache is automatically preserved even if different processes are being executed by different processors.

According to the fourth embodiment, a load module that can be executed even by a computer system employing a distributed shared memory multiprocessor system can be created for a source program created based on multiple-program multiple-data programming executed by a processor (conversely, programs can be created by multiple-program multiple-data programming even for a computer system employing a distributed shared memory multiprocessor). Consequently, even if it is a computer system employing distributed shared memory multiprocessor, load modules of running programs can be created with considerably reduced memory requirement.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A load-module creating method that creates a load module for a program that has plural processes, each process of the program being executed by one processor out of plural processors, the load-module creating method comprising:
   determining if, from amongst the plural processes of the program, at least two processes read the same data included in the program;
   affixing specific identification information to the data that is determined to be read by at least two processes of the program; and
   forming a non-cacheable area in a memory space where all the data to which the identification information is affixed are kept.

2. The load-module creating method according to claim 1, wherein the affixing includes affixing a specific prefix, as the identification information, to the data.

3. The load-module creating method according to claim 1, wherein the affixing includes affixing information that specifies the section to which the data belongs, as the identification information, to the data.

4. A load-module creating method that creates a load module for a program that has plural processes, each process of the program being executed by one processor out of plural processors, the load-module creating method comprising:
   determining if, from amongst the plural processes of the program, at least two processes read the same data included in the program; and
   affixing a cache-invalidate operation instruction to the data that is determined to be read by at least two processes of the program.

5. The load-module creating method according to claim 4, wherein the affixing includes inserting an invalidate instruction for the data just before a load instruction for the data.

6. A computer program, tangibly embodied in a computer medium, that causes a computer to execute a method that creates a load module for a program that has plural processes, each process of the program being executed by one processor out of plural processors, the computer program comprising:
   determining if, from amongst the plural processes of the program, at least two processes read the same data included in the program;
   affixing specific identification information to the data that is determined to be read by at least two processes of the program; and
   forming a non-cacheable area in a memory space where all the data, to which the identification information is affixed, are kept.

7. The computer program according to claim 6, wherein the affixing includes affixing a specific prefix, as the identification information, to the data.

8. The computer program according to claim 6, wherein the affixing includes affixing an information that specifies the section to which the data belongs, as the identification information, to the data.

9. A computer program that causes a computer to execute a method that creates a load module for a program that has plural processes, each process of the program being executed by one processor out of plural processors, the computer program comprising:
   determining if, from amongst the plural processes of the program, at least two processes read the same data included in the program; and
   affixing a cache-invalidate operation instruction to the data that is determined to be read by at least two processes of the program.

10. The computer program according to claim 9, wherein the affixing includes inserting an invalidate instruction for the data just before a load instruction for the data.

11. A load-module creating apparatus that creates a load module for a program that has plural processes, each process of the program being executed by one processor out of plural processors, the load-module creating apparatus comprising:
    a shared data determining unit that determines if, from amongst the plural processes of the program, at least two processes read the same data included in the program;
    an identification information affixing unit that affixes specific identification information to the data that is determined to be read by at least two processes of the program by the shared data determining unit; and
    a shared data area forming unit that forms a non-cacheable area in a memory space where all the data to which the identification information is affixed by the identification information affixing unit are kept.

12. The load-module creating apparatus according to claim 11, wherein the identification information affixing unit affixes a specific prefix, as the identification information, to the data.

13. The load-module creating apparatus according to claim 11, wherein the identification information affixing unit affixes information that specifies the section to which the data belongs, as the identification information, to the data.

14. A load-module creating apparatus that creates a load module for a program that has plural processes, each process of the program being executed by one processor out of plural processors, the load-module creating apparatus comprising,
    a shared data determining unit that determines, if from amongst the plural processes of the program, at least two processes read the same data included in the program; and
    a cache-invalidate operation instruction affixing unit that affixes a cache-invalidate operation instruction to the data that is determined to be read by at least two processes of the program by the shared data determining unit.

15. The load-module creating apparatus according to claim 14, wherein the cache-invalidate operation instruction affixing unit inserts an invalidate instruction for the data just before a load instruction for the data.

* * * * *

UNITED STATES PATENT AND TRADEMARK OFFICE
CERTIFICATE OF CORRECTION

| | |
|---|---|
| PATENT NO. | : 7,117,315 B2 |
| APPLICATION NO. | : 10/603093 |
| DATED | : October 3, 2006 |
| INVENTOR(S) | : Hideo Miyake et al. |

It is certified that error appears in the above-identified patent and that said Letters Patent is hereby corrected as shown below:

Title page, item [57] Column 2 (Abstract), Line 7, after "being" insert --cached--.

Column 18, Line 52, after "comprising" change "," to --:--.

Signed and Sealed this

Thirteenth Day of March, 2007

JON W. DUDAS
*Director of the United States Patent and Trademark Office*